US005612683A

United States Patent [19]

Trempala et al.

[11] Patent Number: 5,612,683

[45] Date of Patent: Mar. 18, 1997

[54] SECURITY KEY HOLDER

[76] Inventors: Dohn J. Trempala, 1215 Dolphin Ter., Newport Beach, Calif. 92625; Geoffrey G. Schulz, 4140 E. Washington, Orange, Calif. 92669

[21] Appl. No.: 296,530

[22] Filed: Aug. 26, 1994

[51] Int. Cl.[6] ........ G06K 7/04

[52] U.S. Cl. ........ 340/825.31; 340/825.34

[58] Field of Search ........ 340/825.31, 825.34, 340/825.52; 70/389; 361/172; 379/103; 380/29

[56] References Cited

U.S. PATENT DOCUMENTS

| | | | |
|---|---|---|---|
| 3,337,992 | 8/1967 | Tolson | 340/825.31 |
| 3,806,874 | 4/1974 | Ehrat . | |
| 3,848,229 | 11/1974 | Perron et al. . | |
| 3,906,460 | 9/1975 | Halpern . | |
| 4,145,568 | 3/1979 | Ehrat . | |
| 4,145,569 | 3/1979 | Ehrat . | |
| 4,315,249 | 2/1982 | Apple et al. | 340/825.52 |
| 4,567,741 | 2/1986 | Trempala | 70/389 |
| 4,593,185 | 6/1986 | Patzelt et al. . | |
| 4,594,637 | 6/1986 | Falk . | |
| 4,609,780 | 9/1986 | Clark . | |
| 4,727,368 | 2/1988 | Larson et al. . | |
| 4,742,426 | 5/1988 | Lavelle | 340/825.31 |
| 4,766,746 | 8/1988 | Henderson et al. . | |
| 4,777,556 | 10/1988 | Imran . | |
| 4,800,255 | 1/1989 | Imran . | |
| 4,825,210 | 4/1989 | Bachhuber et al. | 340/825.31 |
| 4,851,652 | 7/1989 | Imran . | |
| 4,864,115 | 9/1989 | Imran et al. . | |
| 4,887,292 | 12/1989 | Barrett et al. . | |
| 4,896,246 | 1/1990 | Henderson et al. . | |
| 4,914,732 | 4/1990 | Henderson et al. . | |
| 4,916,443 | 4/1990 | Barrett et al. . | |
| 4,929,880 | 5/1990 | Henderson et al. . | |
| 4,947,163 | 8/1990 | Henderon et al. . | |
| 4,988,987 | 1/1991 | Barrett et al. | 340/825.31 |
| 5,003,801 | 4/1991 | Stinar et al. . | |
| 5,014,049 | 5/1991 | Bosley . | |
| 5,046,084 | 9/1991 | Barrett et al. . | |
| 5,094,093 | 3/1992 | Ben-Asher . | |
| 5,140,317 | 8/1992 | Hyatt, Jr. et al. . | |
| 5,204,663 | 4/1993 | Lee | 340/825.34 |
| 5,245,652 | 9/1993 | Larson et al. . | |
| 5,280,518 | 1/1994 | Danler et al. . | |
| 5,305,384 | 4/1994 | Ashby et al. | 380/29 |
| 5,309,743 | 5/1994 | Kokubu et al. . | |
| 5,311,757 | 5/1994 | Spahn . | |
| 5,347,267 | 9/1994 | Murray . | |
| 5,349,346 | 9/1994 | Vanderschel | 340/825.31 |
| 5,351,042 | 9/1994 | Aston . | |
| 5,423,198 | 6/1995 | DiVito et al. . | |

FOREIGN PATENT DOCUMENTS

| | | |
|---|---|---|
| 0311112 | 4/1989 | European Pat. Off. . |
| 1335416 | 4/1971 | United Kingdom . |
| 1401281 | 10/1971 | United Kingdom . |
| 1422217 | 4/1973 | United Kingdom . |
| 1595796 | 3/1977 | United Kingdom . |
| 1595797 | 4/1978 | United Kingdom . |
| 2158870 | 5/1984 | United Kingdom . |
| 2163579 | 8/1984 | United Kingdom . |
| 8600108 | 1/1986 | WIPO . |

OTHER PUBLICATIONS

Brochure and flyer for the Mas–Hamilton "X–07", including cover letter from applicant. no date.

Product Brochure, Sentralok, The Knox Company, Irvine, CA no date.

*Primary Examiner*—Edwin C. Holloway, III

*Attorney, Agent, or Firm*—Knobbe, Martens, Olson & Bear, LLP

[57] ABSTRACT

A security key holder system permits an access key to be released to an authorized individual at a remote location. The access key is secured by a decoder unit that is installed within a vehicle or at a fixed site. To access the key, a person places a call via telephone or radio to a dispatcher station, and applies an identification device to a touch receptacle of the decoder unit. Under the control of a dispatcher, an encoder unit generates an encrypted key release code using the state of an internal real time clock to select an encryption method. The encrypted code is transmitted over an RF radio channel, over the telephone system, or over a dedicated cable, depending upon the installation (mobile or base) of the target decoder unit. Decoder units that receive the transmission use their respective real time clocks to select a decryption method. Decoder units that successfully decrypt the encrypted code use the transmission to synchronize their respective real time clocks, and then compare an internal station code with a station code field of the decrypted key release code. If the station codes match, and an identification number read from the identification device is valid, the decoder unit rotates a stepper motor to open a lock and release the access key. A history file maintained by each decoder unit records the release time, identification number, and duration of use associated with each release of the access key.

56 Claims, 16 Drawing Sheets

SECURITY KEY HOLDER

BACKGROUND OF THE INVENTION

1. Field of the Invention

The present invention relates to computer-controlled locking devices. In particular, the present invention relates to a system and method for controlling and monitoring the release o a key from a remote location.

2. Description of the Related Art

In various situations it is desirable to secure an access key in one location, and to control the release of the access key from a remote location to an individual entitled to access. U.S. Pat. No. 4,567,741 to the applicant discloses a security key holder system that enables this function to be performed. The system comprises an encoder unit and a decoder unit. The decoder unit has an access key socket for securing an access key (by the coded portion of the access key), and a secondary key socket for the insertion of a secondary key.

The access key can be rotated and removed from the access key socket only upon the substantially simultaneous occurrence of two events. The first event is the transmission of a key release signal from the encoder unit to the decoder unit. The key release signal activates a solenoid inside the decoder unit, thereby allowing the secondary key to be rotated. The second event is the insertion and rotation of a secondary key in a secondary key socket. Once the secondary key has been rotated, the access key can be rotated and removed.

The decoder unit is typically mounted in a fire truck or a public location, and the encoder unit is typically located at a remote dispatcher station such as a fire station. The system typically serves to secure a master access key to one or more buildings, and to release the key in an emergency situation such as a fire.

The release signal is transmitted to the decoder unit in one of two ways. The first is via the two-way radio system commonly used by fire and police departments, and is used primarily when the decoder unit is mounted within a fire truck or police car. The decoder unit is merely connected to the receiver of the existing two-way radio of the vehicle. The second is via a telephone network. This second method of transmitting the release signal is generally used when the decoder unit is mounted in a fixed location such as an office building.

The system provides a high level of security against the unauthorized release of the access key, since the access key can only be removed by one in possession of a secondary key, and only when the key release signal is received. To further protect against unauthorized releases, each individual decoder unit is assigned a unique release signal. To protect against forced entry, the decoder unit has a housing composed of hardened steel, and the access key is surrounded by a steel barrier to protect against the use of forcing tools.

Although the system described above is more than adequate for the applications for which it was designed, there exists a need to provide a higher level of protection against unauthorized key releases in certain situations. For example, the system described above may not provide the level of security desired for securing a key that provides access to an art museum. It is an object of the present invention, therefore, to provide a security key holder suitable for applications for which the risk of an unauthorized release is inordinate.

SUMMARY OF THE INVENTION

The present invention relates to a system and method for controlling the release of an access key. In a preferred embodiment, the system includes a microprocessor-controlled encoder unit (or multiple encoder units) and one or more microprocessor-controlled decoder units. Each decoder unit secures an access key within a rotatable key socket. The rotatable key socket is mechanically coupled to a lock that prevents the key from being rotated and removed when the lock is in a locked or secure state. Each decoder unit has a built-in real time clock which must be synchronized with a real time clock of the encoder unit for the access key to be released.

In a preferred system configuration, the encoder unit is located at a dispatch station such as a police station or security center, and is connected to a telephone line and/or RF transmitter to permit communication with the decoder units of the system. Each decoder unit of the system is installed either at a fixed site or within a vehicle. Decoder units installed within vehicles (mobile decoder units) are connected to a receiver of a two-way radio. Decoder units installed at fixed sites (base decoder units) are connected via MODEM to a telephone line. Base decoder units located in close proximity to the encoder unit may additionally or alternatively be hardwire-connected to the encoder unit.

In a preferred embodiment of the decoder unit, a stepper motor is mechanically coupled to a latch gate of the lock to control the state of the lock, and a microprocessor is connected to the stepper motor to control the rotation of the stepper motor. When the latch gate is in the locked position, the access key secured by the decoder unit cannot be rotated and removed. When the latch gate is in the unlocked position, the access key can be rotated and removed. To achieve a high level of security, the stepper motor is connected to the microprocessor such that a minimum sequence of binary values must be generated by the microprocessor for the lock to be unlocked (i.e., for the latch gate to be moved to an unlocked position) and the access key released. This technique for controlling the state of the lock significantly reduces the possibility of an erroneous key release in the event of a software or microprocessor failure.

A spring connected to the latch gate of the lock biases the gate toward a locked position. The spring produces a force that is sufficient to backdrive the stepper motor, so that the lock is returned to a locked state if power is interrupted or an electrical malfunction occurs as the stepper motor is being rotated to an unlocked position. One or more microswitches are provided internal to the decoder unit to sense the state of the lock, so that changes in the status of the lock can be recorded to memory and/or signaled to authorized personnel. The decoder unit also includes a touch receptacle for receiving a memory device, an alarm output for sounding an external alarm if the access key is not returned within a pre-specified period of time, means for checking and recording the identity of the person that accesses the key, various means for remotely updating code and data files stored within the decoder unit, and a voice synthesizer for allowing the status of a base-installed decoder unit to be verbally conveyed via telephone.

In accordance with a preferred method of operation, the system operates as follows. Under the control of a dispatcher, the encoder unit transmits an encrypted block of data or "code." The encrypted code includes a command field and a station code field. The command field specifies the function to be performed by the decoder unit, such as the release of an access key, or a modification to a list of authorized users stored in the memory of a decoder unit. The station code uniquely identifies a target decoder unit (or group of target decoder units).

To request the release of an access key, an authorized user of a decoder unit places a call (via radio or telephone) to the dispatcher, and identifies the target decoder unit to the dispatcher. The authorized user also touches a touch memory device (that serves as a user identification key) to a touch receptacle of the decoder unit to transfer a user identification number to the decoder unit. The dispatcher then transmits an encrypted code that includes the key release command and a station code that identifies the target decoder unit.

To achieve a high level of security, the encoder unit varies the encryption algorithm with the current time and date, which are maintained by the real time clock of the encoder unit. The encrypted code is transmitted using FSK (frequency key-shifting) or DTMF (dual tone multi-frequency), and may be transmitted via radio, telephone or hardwire connection, depending upon the type of installation of the target decoder unit (i.e., mobile or fixed-site). All decoder units that receive the transmission from the encoder unit attempt to decrypt the code. A decoder unit will decrypt the code only if its real time clock is synchronized to the real time clock of the encoder unit (within a variable tolerance level). All decoder units that decrypt an encrypted transmission use the transmitted code to update their respective real time clocks, and then proceed to compare the transmitted station code with an internally-stored station code. If the transmitted station code matches the station code of a decoder unit, and a key release command is specified, the decoder unit compares the user identification number read-in from the touch memory device with a list of valid user identification numbers. If the user identification number is found to be valid, the decoder unit unlocks the lock that secures the access key, allowing the authorized person to rotate and remove the access key from the decoder unit key socket, and the event is stored to the memory of the decoder unit. If the key is removed, an internal key use timer is started to measure the time that the access key is released.

In an alternative embodiment of the system, the decoder unit releases the key as described above, but without reading or checking a user identification number from an identification key. In yet another embodiment, the key is released when a valid user identification number is read in from an identification key, without the transmission of an encrypted code from an encoder unit.

Other features and advantages of the present invention will be apparent from the detailed description that follows.

DETAILED DESCRIPTION OF THE PREFERRED EMBODIMENTS

The present invention relates to a security key holder system and method for securing and controlling the release of one or more access keys. In a preferred embodiment, the system includes a microprocessor-controlled encoder unit (or multiple encoder units) and one or more microprocessor-controlled decoder units. Throughout the description that follows, the system will be described as if a single encoder unit is used to control the decoder units of the system. However, it should be understood that multiple encoder units can be used to control the same decoder unit (or set of decoder units) if desired.

The description that follows is divided into the following sections: Basic Components of the System; General Operation of the System; Encoder Unit Circuit; Encoder unit Front Panel (and Installation Options); Decoder Unit Circuit; Stepper Motor; Key Release Sequence-Encoder Unit; Key Release sequence-Decoder Unit; Mechanical Features of Decoder Unit; and Alternative Embodiments.

1. Basic Components of the System

Figure 1:
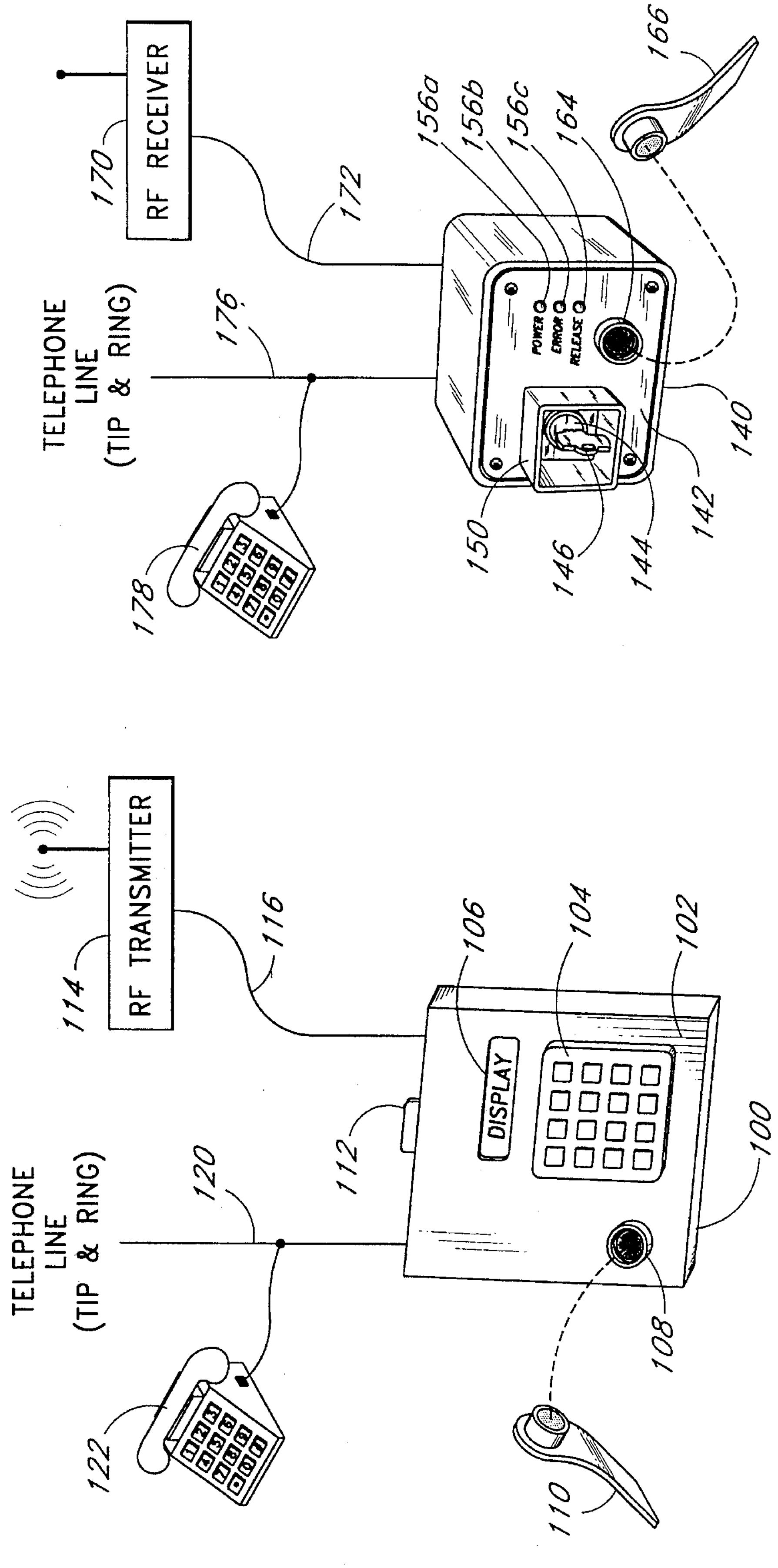
FIG. 1 illustrates the components of a security key holder system in accordance with a preferred embodiment of the present invention.

FIG. 1 illustrates the basic components of a security key holder system in accordance with the present invention. A microprocessor-based encoder unit 100 has a front panel 102 with a keypad 104, a display 106, and a touch receptacle 108 for receiving a touch device 110. The encoder unit 100 has an RS-232 port 112 to permit communication with a printer, personal computer (PC), dumb terminal or other device (printer, PC and dumb terminal not shown). The encoder unit 100 may be connected to an RF transmitter 114 by a shielded cable 116. The encoder unit 100 may additionally or alternatively be connected to the tip and ring lines of a telephone line 120, in which case the telephone line 120 is connected to a telephone 122.

A microprocessor-based decoder unit 140 has a front panel 142 with a key socket 144 that holds an access key 146 (hereinafter "key 146"). The key socket 144 is part of a conventional key-activated cam-lock that serves as a key capture device for securing the key 146 by a coded portion of the key 146. The key 146 is shown in FIG. 1 in a locked rotational position. When a lock 1115 (FIGS. 11–13) internal to the decoder unit 140 is in an unlocked state, the key 146 can be rotated and removed from the key socket 144.

The key socket 144 is surrounded by a metal housing 150 to protect the key socket 144 and key 146 from being pried free. The front panel 142 has a power indicator light 156*a*, an error indicator light 156*b*, and a release indicator light 156*c*. The front panel 142 also has a touch receptacle 164 for receiving a touch device 166. Additional decoder units (not shown) may be included in the system.

The decoder unit 140 may be installed within a vehicle such as a patrol car. For such mobile installations, the decoder unit 140 is connected to an RF receiver 170 by a shielded cable 172. An RF receiver of an existing two-way radio in the vehicle is preferably used for this purpose.

The decoder unit 140 may alternatively be installed at a fixed site. For such base installations, the decoder unit 140 is preferably connected to the tip and ring lines of a telephone line 176. The telephone line 176 is also connected to a telephone 178. However, for system configurations wherein the encoder unit 100 and decoder unit 140 are in relatively close proximity (such as the same building), the encoder and decoder units 100, 140 may alternatively (or additionally) be hardwire-connected. A hardwire connection can be made by connecting a radio connector 226 (FIG. 2) of the encoder unit 100 directly to a radio connector 526 (FIG. 5) of the decoder unit 140 using a shielded cable.

In the preferred embodiment, the touch devices 110, 166 are products that are available from Dallas Semiconductor. Several types of Dallas Semiconductor touch devices are used with the system. For example, a RAM-based DS1991 Touch MultiKey with password (or a ROM-based DS1990, which does not include a password) is used as an identification key for accessing the system. A RAM-based Touch Memory™ device such as a DS1993 4k-bit Touch Memory™ is used for transferring data between the encoder unit 100 and the decoder unit 140. A RAM-based DS1994 Touch Memory® with timer is used when it is desired to automatically invalidate a touch device after a specified period of time. A DS1494L-F5 Time-In-A-Can is used to synchronize real time clocks in encoder and decoder units 100, 140. Each touch device carries a unique 48-bit factory-lasered ID code that allows the encoder unit 100 or decoder unit 140 to identify the type of touch device being applied, and the identity of the user to which the touch device was issued.

The touch receptacles 108, 164 are preferably DS9092 devices available from Dallas Semiconductor, and can be used with a variety of Dallas Semiconductor touch devices, including all of the touch devices mentioned above.

2. General Operation of the System

A high level description of the operation of the security key holder system will now be provided. This description will focus on the interaction of the components shown in FIG. 1. A relatively low-level description will then be provided in the sections that follow, which will focus on the hardware and software of the encoder and decoder units 100, 140.

Throughout the functional descriptions that follow, it should be understood that the system can be programmed or otherwise configured to operate in a manner other than that described. For example, there are numerous methods that are known in the art for encrypting a code for transmission, any of which may be used by the system. Thus, the functional descriptions are provided to illustrate certain exemplary methods for using the system, and are not intended to limit the scope of the present invention.

Referring to FIG. 1, each dispatcher authorized to use the encoder unit 100 has a touch device 110 that serves as an identification key. In the preferred embodiment, a DS1990 Touch Serial Number device is used that stores a 48-bit personal identification number (PIN) plus 8 cyclical redundancy check (CRC) bits. Upon initiation of a log-in sequence, the dispatcher (or other user) is prompted to touch the identification key 110 to the receptacle 108. Upon touching the identification key 110 to the receptacle 108 (for at least five milliseconds), the PIN and CRC bits are serially transmitted from the identification key 110 to the encoder unit 100 using a one-wire protocol. The one-wire protocol is specified in the data sheets for Dallas Semiconductor DS199x products.

The encoder unit 100 generates a CRC value (via an assembly language routine) as it receives the 48-bit identification code, and then compares the calculated CRC value to the CRC value received. If the two CRC values do not match, an error message is displayed on the display 106. If the two CRC values match, the encoder unit 100 compares the 48-bit PIN with an internally-stored list of PINs for authorized users of the system. In the preferred embodiment, the encoder unit 100 also stores the PIN and time for the attempted log-in in an encoder unit history file.

The software for the encoder unit 100 can be written to additionally or alternatively prompt the dispatcher to touch the identification key 110 to the receptacle 108 before performing a certain function. For example, the dispatcher can be prompted to apply the identification key 110 before sending a key release command, or before accessing the encoder unit history file. Access to certain system functions can thereby be limited to certain individuals.

Once the log-in sequence is successfully completed, the dispatcher can use the keypad 104 to select a menu item, or to send a key release command to a selected decoder unit 140. Menu items may include, for example:

1. Software update to encoder unit;
2. Software update to a selected decoder unit;
3. Authorized-user list update to encoder unit;
4. Authorized-user list update to selected decoder unit;
5. Print encoder history file;
6. Print decoder history file for selected decoder; and
7. Transfer data to/from PC via RS-232 port 112.

In a preferred embodiment, when an individual requires access to the key 146 held by the decoder unit 140, the individual (e.g., security guard, policeman, etc.) places a call via radio or telephone to the dispatcher station and identifies the decoder unit 140 to which access is desired. The individual also touches an identification key 166 to the receptacle 164 to transmit a PIN (plus CRC) to the decoder unit 140. For embodiments that use a DS1991 MultiKey device for the identification key 166, the decoder unit 140 must transmit a password to the identification key 166 before the PIN can be read. In the preferred embodiment, the decoder unit 140 stores the PIN for a preprogrammed period of time, typically in the range of 10 to 60 seconds. If a key release command is received by the decoder unit 140 during that time (via the telephone line 176 or RF receiver 170), the decoder unit 140 compares the PIN to a list of PINs for authorized users of the decoder unit 140.

If the decoder unit 140 is installed at a fixed site using a telephone line, the release-request call is placed from the telephone 178 to the telephone 122, and the telephone connection is maintained until the key 146 is released. Thus, the telephone connection established by the release-request call is used to transmit the encrypted code from the encoder unit 100 to the decoder unit 140. In the preferred embodiment, the encrypted code is transmitted using FSK (frequency key shifting) coding. In an alternative embodiment DTMF (dual tone multi-frequency) coding is used.

If the decoder unit 140 is installed within a vehicle, the release-request call is made via a two-way radio. The encrypted code is then provided by the encoder unit 100 as an FSK (or DTMF) signal on the cable 116 by the encoder unit 100. The signal is transmitted by the RF transmitter 114, and is reproduced on the cable 172 by the RF receiver 170. The FSK (or DTMF) signal can by transmitted from the RF transmitter 114 to the RF receiver 170 using any suitable modulation method (AM, FM, etc.) and frequency, although the modulation method and frequency will normally be dictated by the existing two-way radio system used with the vehicle. All decoder units that detect the transmission of the encrypted code attempt to decrypt the encrypted code.

If the decoder unit 140 decrypts the encrypted code and the station code of the decoder unit 140 matches the station code received, the decoder unit 140 checks the validity of the PIN. If the PIN is valid, the decoder unit 140 enters into a routine to rotate a stepper motor 514 (FIGS. 5, 6, and 11–13) to unlock a lock 1115 (FIGS. 11–13) of the decoder unit 140, allowing the key 146 to be rotated and removed from the key socket 144. The release light 156*c* is then illuminated to indicate that the key 146 can be removed, and the date, time and PIN are stored in a history file for the decoder unit 140. The date, time and PIN are also stored if the PIN is invalid.

The lock 1115 is maintained in an unlocked state for a preprogrammed "release window," during which time the key 146 may be rotated and removed from the socket 144. If the key socket 144 is rotated to an unlocked position at the end of the release window (indicating that the key 146 is either removed or in an unsecured state), a key use timer of the decoder unit 140 is started. If the key use timer expires before the key 146 is returned and rotated to the locked (e.g., vertical) position, an alarm output (FIG. 5) of the decoder unit 140 is optionally made active to sound an external warning alarm (not shown). For fixed-site installations, the decoder unit 140 may also be programmed to place a telephone call to the dispatch station (or other location) to warn a dispatcher of the failure to return the key 146. A speech synthesizer (FIG. 5) can be used for this purpose to verbally inform the dispatcher of the event. Alternatively, a MODEM (FIG. 5) of the decoder unit 140 can be used to send a data transmission to a dispatch station computer. Once the key 146 is re-inserted in the key socket 144 and rotated to the locked position, the key use timer is stopped, and the duration of use is recorded in the history file for the decoder unit 140.

In an alternative embodiment, the system is configured so that each decoder unit 140 releases a key 146 upon receiving a key release command from the encoder unit 100, without reading or verifying a PIN from an identification key 166. In yet another embodiment, the system is configured so that each decoder unit 140 releases the key 146 upon application of a valid identification key 166 to the touch receptacle 164, without receiving a key release command from an encoder unit 100.

As illustrated in FIG. 1, the system is preferably configured for simplex RF operation, wherein vehicle-installed decoder units can receive data from the encoder unit 100, but cannot transmit handshaking of other signals to the encoder unit 100. This simplex configuration reduces the complexity of the interface between the two-way radio of the vehicle and the decoder unit 140, and additionally eliminates the need to interface the encoder unit 100 to an RF receiver. To provide flexibility, however, the encoder unit 100 and decoder unit 140 are designed to permit half-duplex (i.e., non-simultaneous, bi-directional) operation.

Although the absence of handshaking in simplex configurations can reduce the reliability of data transmission, a high degree of reliability is maintained by including routines in the transmission software that combine data redundancy and data interlacing techniques. The transmission software also includes certain fail-safe mechanisms to essentially ensure that an erroneous data transmission will not result in the release of a key. This ensures that an uncorrectable error in a data transmission will merely cause a key to not be released—a failure that can easily be cured by requesting a retry over the two-way radio of the vehicle. The data redundancy, data interlacing and fail-safe techniques are described below in the sections entitled "Key Release Sequence-Encoder Unit" and "Key Release Sequence-Decoder Unit."

For base-installed decoder units that communicate with the encoder unit 100 via a telephone line, the cost of supporting duplex operation is minimal. Thus, in the preferred embodiment, the software for the encoder and decoder units 100, 140 supports two-way communications via the telephone system.

History data stored in the decoder unit 140 can be transferred to the encoder unit 100 using a RAM-based version of the touch device 100, such as a DS1993. For base decoder units, the history data can alternatively be transferred to the encoder unit 100 via MODEM. Software routines for the encoder unit 100 can then be used to generate a customized report, which can be sent to a printer via the RS-232 port 112.

3. Encoder Unit Circuit

The encoder unit 100 includes a main circuit board (hereinafter "main board") and a front panel circuit (hereinafter "front panel"). The main board and front panel are controlled by separate microprocessors. Multiple front panels can be daisy-chain connected to a single main board to permit shared use of a single encoder unit 100 by multiple users.

Figure 2:
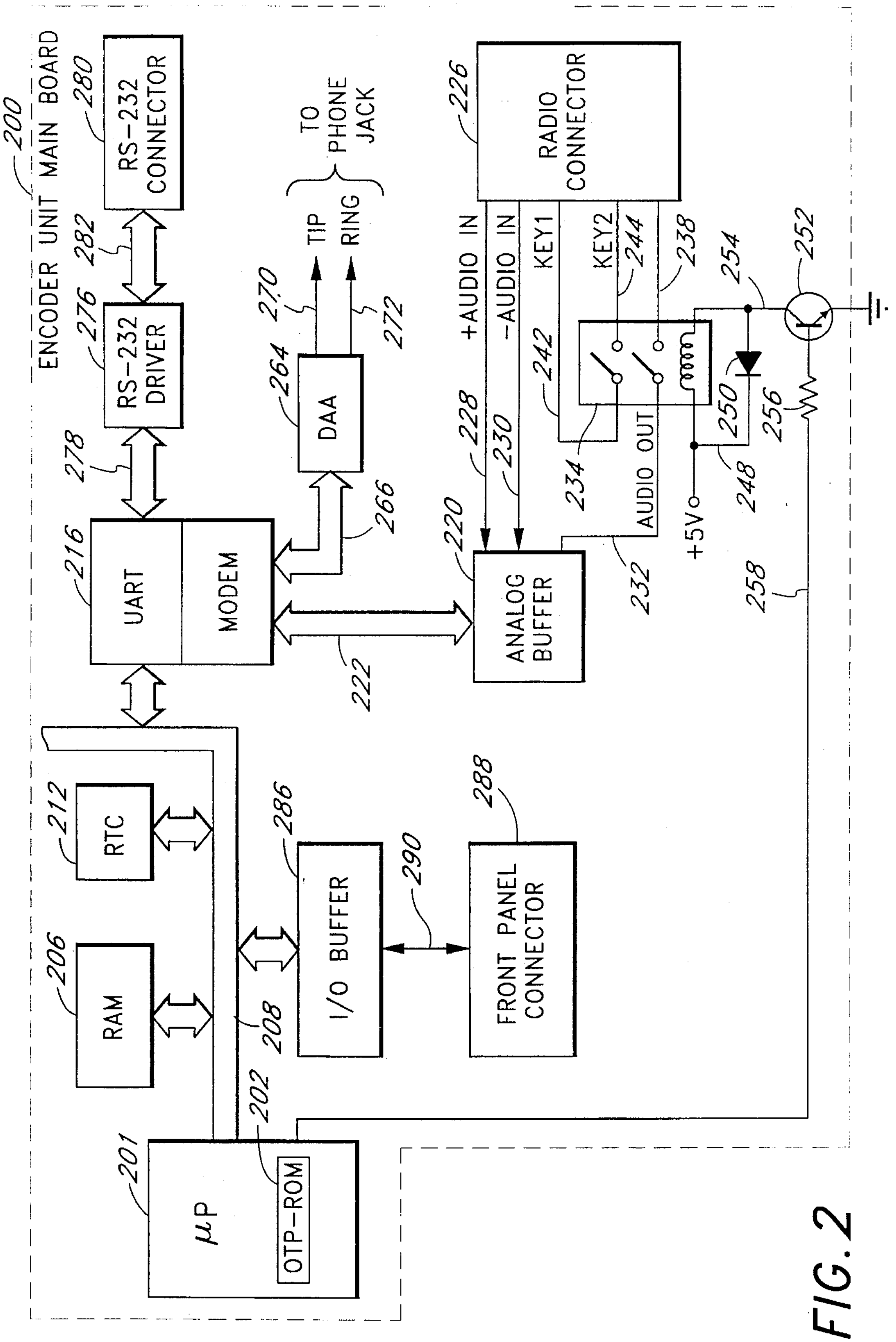
FIG. 2 illustrates the main board circuit of an encoder unit shown in FIG. 1.

FIG. 2 is a high-level block diagram for the main board 200 of the encoder unit 100. The circuit comprises a microprocessor 201 (μP) that has an embedded one-time-programmable (OTP) ROM 202. In the preferred embodiment, the microprocessor 201 is an 8751 embedded 8-bit microcontroller available from Intel and the like. However, as will be recognized by those skilled in the art, other conventional microprocessors can be used in place of the 8751, including other microcontrollers in the 8051 family. Further, a customized application-specific integrated circuit (ASIC) can be used for the microprocessor 201, in which case other components shown in FIG. 2 may be integrated onto a single chip along with the microprocessor 201.

The OTP-ROM 202 holds executable code for the system, including the menu program, data transmission routines, and an interpreter for interpreting commands read from random access memory (RAM) 206. Code data burned into the embedded OTP-ROM 202 cannot be accessed from the pins of the microprocessor 201. Thus, the use of a microprocessor 201 having a one-time-programmable ROM 202 protects against unauthorized access to the software routines used by the system. Such protection is desirable to secure against unauthorized accesses to the data transmission routines used to generate and transmit the encrypted code.

The microprocessor 201 is connected to a bus 208. In the preferred embodiment the bus 208 is connected to the 32 port lines and the ALE (address latch enable) line of the 8751. Bus arrows shown in FIG. 2 for the bus 208 indicate the directions of data flow between the microprocessor 201 and the devices (and memory) connected to the bus 208.

The microprocessor 201 is connected to an array of random-access memory 206 (RAM) by the bus 208. In the preferred embodiment, the RAM 206 consists of 512K of nonvolatile static RAM. The RAM 206 is used to hold certain non-executable data such as a list of authorized PINs, the encoder unit history file, and history files for one or more decoder units of the system. The RAM 206 is also used to store software updates.

The microprocessor 201 is connected to a real time clock 212 (RTC) by the bus 208. In the preferred embodiment, the RTC 212 is implemented using a DS1216D SmartWatch/RAM available from Dallas Semiconductor. The DS1216D is a 32-pin DIP socket with a built-in CMOS watch circuit, a non-volatile RAM controller circuit, and an embedded lithium energy source. The watch circuit keeps track of time in hundredths of seconds, seconds, minutes, hours, days, months and years. The lithium energy source of the DS1216D is used as the power source for maintaining the contents of the nonvolatile RAM 206.

The microprocessor 201 is connected to a UART (universal asynchronous receiver/transmitter)/MODEM 216 by the bus 208. In the preferred embodiment, the UART/MODEM 216 comprises a 73K222U available from Silicon Systems. The 73K222U combines a UART and an FSK MODEM into a single package. The UART section of the 73K222U converts parallel data (i.e., bytes) received from the microprocessor 201 into serial data for transmission by the MODEM, and converts serial data asynchronously received from the MODEM section into parallel data that can be read by the microprocessor 201. The MODEM section of the 73K222U transmits and receives data in an FSK format (i.e., a first frequency for a logic low level, and a second frequency for a logic high level). The MODEM section of the 73K222U can also generate DTMF tones.

The MODEM output of the UART/MODEM 216 is connected to an analog buffer 220 by a bus 222. In the preferred embodiment, the bus 222 is connected to the TXA1 output pin (not shown) and the RXA input pin (not shown) of the 73K222U UART/MODEM 216. The analog buffer 220 is connected to a radio connector 226 by a +AUDIO IN signal line 228, and also by a –AUDIO IN signal line 230. The +AUDIO IN and –AUDIO IN signal lines 228, 230 can be used with half-duplex embodiments of the system wherein the encoder unit 100 can receive RF data transmissions from the decoder unit 140. For simplex embodiments of the system, the +AUDIO IN and –AUDIO IN signal lines 228, 230 are not used.

The analog buffer 220 has an AUDIO OUT signal line 232 that is switchably connected to a line 238 by a first switch of a two-switch relay 234. The line 238 is connected to the radio connector 226. The second switch of the relay 234 switchably connects a KEY1 line 242 to a KEY2 line 244. The KEY1 and KEY2 lines 242, 244 are connected to the radio connector 226, and are used to key up the RF transmitter 114 (FIG. 1). A first side of the relay coil of the relay 234 is connected to a 5-volt source (+5 V) and to the cathode of a diode 250 by a line 248. The second side of the relay coil is connected to the anode of the diode 250 and to the collector of an NPN transistor 252 by a line 254. The emitter of the transistor 252 is connected to ground. The base of the transistor 252 is connected through a resistor 256 to a line 258. The line 258 is connected to a dedicated port bit of the microprocessor 201.

The MODEM output of the UART/MODEM 216 is also connected to a standard data access arrangement circuit 264 (DAA) by a bus 266. In the preferred embodiment, the bus 266 is connected to the TXA1, TA2 and RXA pins of the 73K222U UART/MODEM 216. The DAA 264 converts the impedance and current levels of the UART/MODEM 216 signal lines to appropriate levels for connection to a public switching network. The DAA 264 also performs ring detection for the UART/MODEM 216. The DAA 264 is connected to a phone jack (located on a rear panel of the encoder unit 100) by a TIP line 270 and a RING line 272.

The UART output of the UART/MODEM 216 is connected to an RS-232 driver chip 276 by a bus 278. The RS-232 driver chip 276 performs DC-to-DC level conversion for the standard RS232 receive, transmit, data-terminal-ready and clear-to-send signal lines (signal lines not shown). In the preferred embodiment, a DS1228 +5 V-powered RS-232 driver available from Dallas Semiconductor is used, which uses a +5 V power supply to generate the +12 V/–12 V levels required for RS-232 communication. The RS-232 driver 276 is connected to an RS232 connector 280 by a bus 282. The connector 280 connects the RS-232 driver 276 to the RS-232 port 112 (FIG. 1) on the rear panel of the encoder unit 100.

Figure 3:
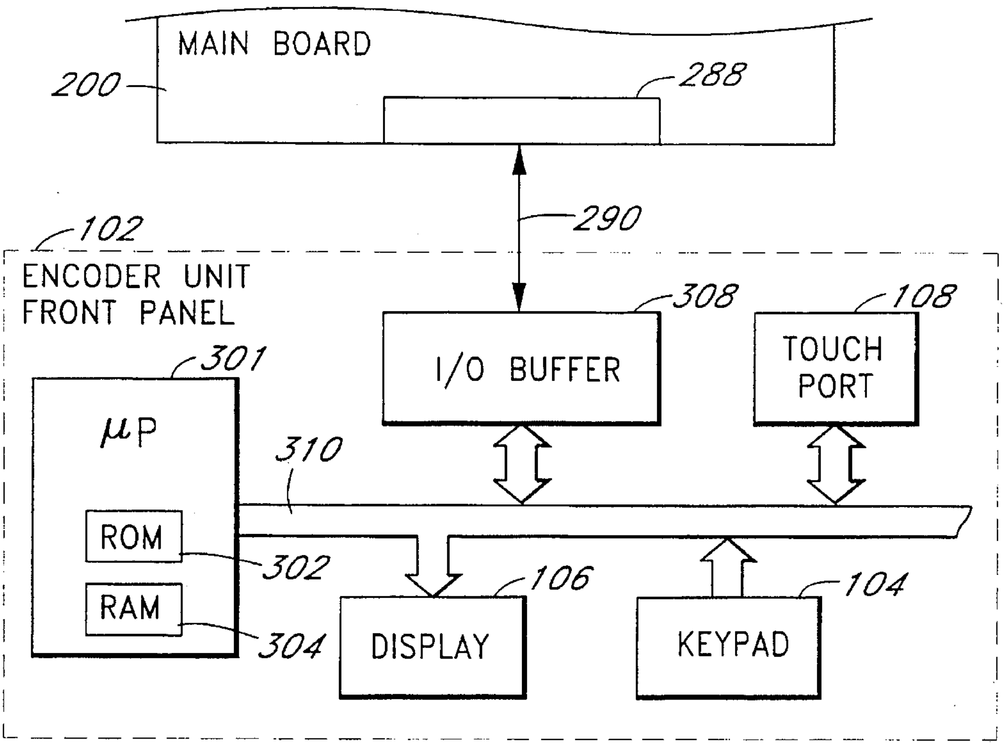
FIG. 3 shows the front panel circuit of the encoder unit connected to a main board circuit of the encoder unit, in accordance with one installation option of the encoder unit.
Figure 4:
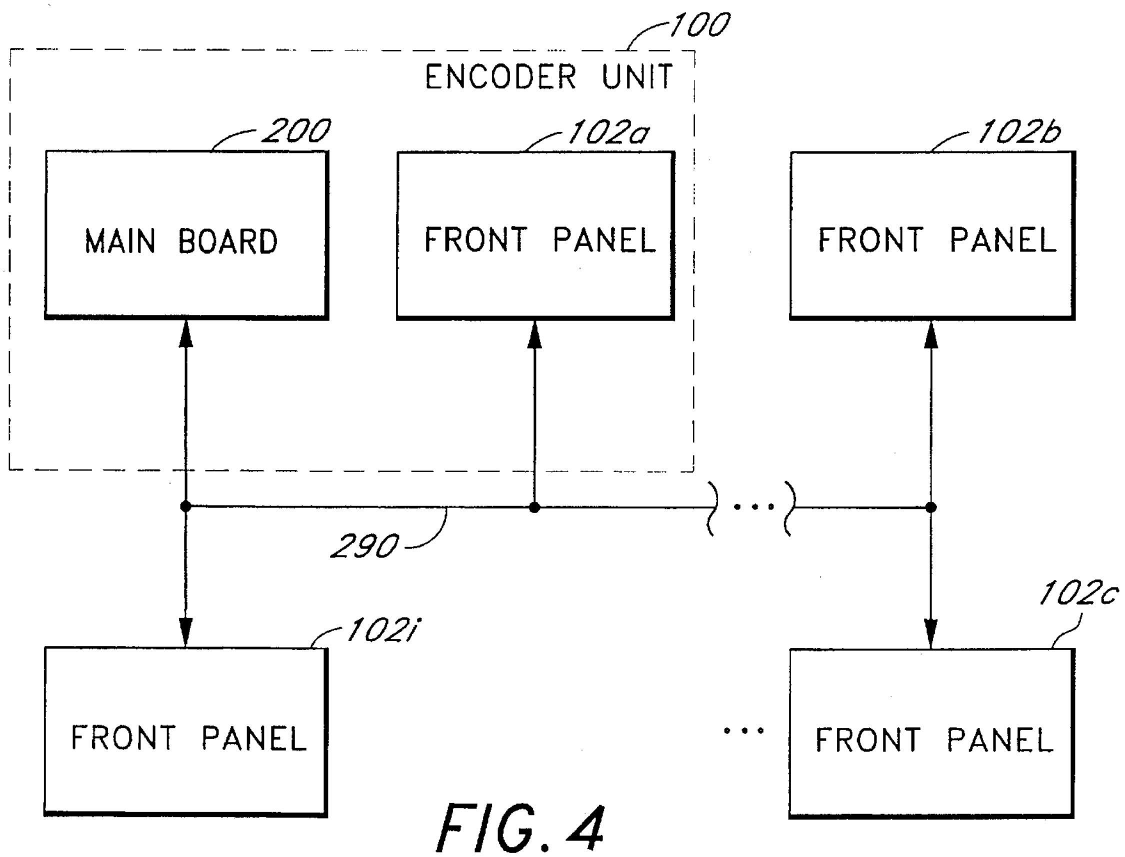
FIG. 4 illustrates an alternative installation for the encoder unit, wherein multiple front panel circuits are daisy-chain connected to a single main board circuit to allow multiple users to simultaneously use a single encoder unit.

The microprocessor 201 is connected to an I/O buffer 286 by the bus 208. In the preferred embodiment, the I/O buffer 286 is connected to two dedicated port bits of the microprocessor 201. The I/O buffer 286 performs level conversion for communication with the front panel 102 (FIGS. 1 and 3). A front panel connector 288 is connected to the I/O buffer 286 by a line 290. The front panel connector 288 permits connection of the main board 200 to one or more front panels (as shown in FIGS. 3 and 4).

A general functional description of the main board circuit 200 of FIG. 2 will now be provided. A description of a preferred method used for generating and transmitting a key release command using the main board circuit 200 will be provided below in the section "Key Release Sequence-Encoder Unit."

Referring to FIG. 2, the microprocessor 201 normally executes code only out of the OTP-ROM 202. However, code updates that have been made to the system are executed out of the RAM 206. Code updates held by the RAM 206 are written in an interpretive language, and thus require special decoding by the microprocessor 201 prior to execution. Instructions of this interpretive language are written such that the contents of the embedded OTP-ROM 202 cannot be accessed.

To access the contents of the RTC 212, the microprocessor 201 must initially perform 64 consecutive write operations to generate a 64-bit serial data pattern that matches a 64-bit pattern held by the DS1216D 212. The details of this process are described in the data sheets for the DS1216D 212. Once the pattern recognition sequence is completed, the microprocessor 201 can access the contents of the eight registers of the DS1216D 212 to read or modify the date and time stored therein. Reads from the RTC 212 are performed whenever the encoder unit 100 stores an entry in the encoder history file, and whenever the encoder unit 100 encrypts data.

The microprocessor 201 performs reads and writes of data to the UART/MODEM 216 to communicate with external devices. Both the UART and the MODEM functions of the UART/MODEM 216 are used when the encoder unit 100 communicates with a decoder unit 140 (via phone line, RF or hardwire transmission). Only the UART function of the UART/MODEM 216 is used when the encoder unit 100 communicates via the RS-232 port (with a printer, PC, etc.). The DTMF generation function of the UART/MODEM 216 can optionally be used to place calls to base-installed decoder units, to control other devices using a DTMF protocol, and to generate repeater patch commands for communicating with mobile decoder units.

The encoder unit 100 can be programmed to automatically place calls at a certain time during the night (using the RTC 212 to check the time), to permit base decoder units to automatically transfer history data to the encoder unit 100 on a periodic basis.

The RS-232 port 112 (FIG. 1) can be used to permit communication with a PC. History data can thereby be archived on a hard disk or other storage device of the PC. The PC can also be used to perform printer functions, and to make program updates to the encoder unit 100. The RS-232 port 112 can also be used to communicate directly with a printer (for printing history reports, etc.), or to communicate with a dumb terminal.

To key up the RF transmitter 114 (FIG. 1) to send an encrypted code via RF, the microprocessor 201 sets the line 258 high by writing a "1" to the dedicated port bit to which the line 258 is connected. The port bit remains set until a zero is written to the port bit. The high level on the line 258 causes the transistor 252 to conduct, thus causing current to flow through the coil of the relay 234. This causes both contacts of the relay to close, connecting the KEY1 line 242 to the KEY2 line 244 to key up the RF transmitter 114, and connecting the AUDIO OUT line 232 to the line 238 to pass the FSK (or DTMF) signal generated by the UART/MODEM 216 to the RF transmitter 114.

The microprocessor 201 communicates with one or more front panels 102 by performing reads and writes to/from the I/O buffer 286. Data is transferred between the I/O buffer 286 and the front panel 288 over the line 290, as further described below.

4. Encoder Unit Front Panel and Installation Options)

FIG. 3 illustrates the circuit for the front panel 102 of the encoder unit 100. The electrical connection of the front panel 102 to the main board 200 is shown in FIG. 3 for a single front panel installation. The front panel circuit comprises a microprocessor 301 that has an embedded ROM 302 and an embedded RAM 304. In the preferred embodiment the microprocessor 301 is an 87C751 microcontroller available from Phillips and the like, with 2 k bytes of ROM and 64 bytes of RAM. The microprocessor 301 is connected to the keypad 104, the display 106, the touch receptacle 108, and an I/O buffer 308 by a bus 310. The arrows shown with the bus 310 indicate the direction of data flow between the microprocessor 301 and the respective devices 104, 106, 108, and 308.

The keypad 106 is preferably a 4×4 matrix contact arrangement keypad supplied by Greyhill, with customized imprints on individual keys (keys shown in FIG. 1). The display 106 is preferably an intelligent LED display having a built-in ASCII-to-fourteen segment decoder.

FIG. 4 illustrates how multiple front panels 102*a*, 102*b*, 102*c*, 102*i* of a variable number can optionally be connected to a single main board 200. Each front panel 102*a*, 102*b*, 102*c*, 102*i* is connected to the main board 200 by the line 290, which acts as a one-wire bus for serially transmitting data between the main board 200 and the front panels 102*a*, 102*b*, 102*c*, 102*i*. To transmit data to one of the front panels 102*a*, 102*b*, 102*c*, 102*i*, the main board initially transmits an address on the line 290 to specify a target front panel. To receive data, the main board 200 polls the individual front panels 102*a*, 102*b*, 102*c*, 102*i* to determine whether a front panel has data to send. Data is transferred on the one-wire bus 290 using pulse width modulation techniques that are well known in the art.

The use of multiple front panels connected to a single main board 200 permits multiple dispatchers to use a single encoder unit simultaneously. The use of multiple front panels further permits all encoder activity and history data to be maintained within a single encoder unit, and eliminates the need to synchronize the real time clocks of multiple encoder units.

5. Decoder Unit Circuit

Figure 5:
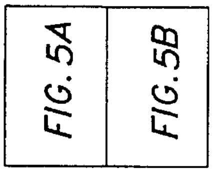
FIG. 5, consisting of FIGS. 5A–5B, illustrates the circuitry of the decoder unit of FIG. 1.
Figure 5A:
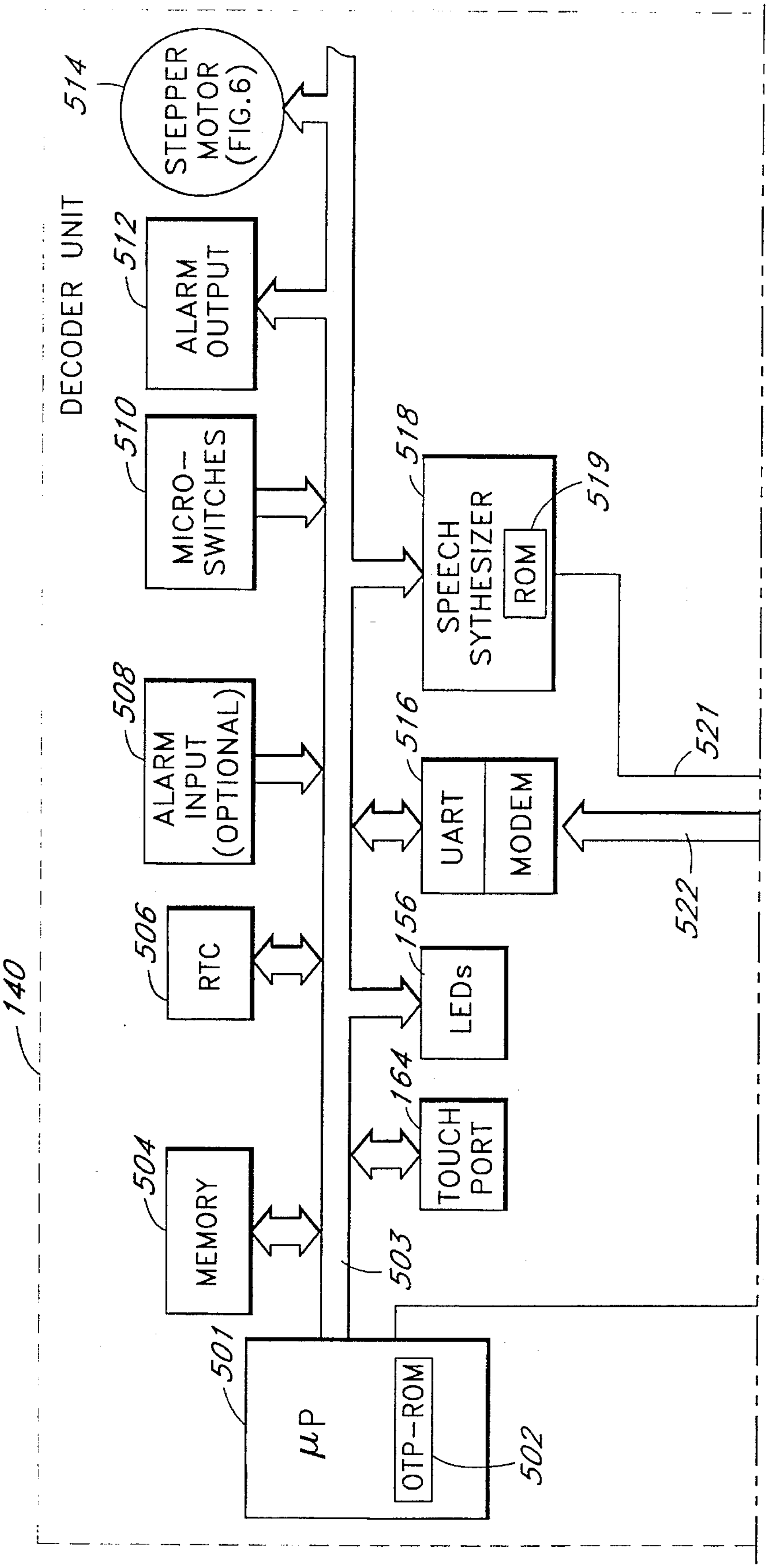
Figure 5B:
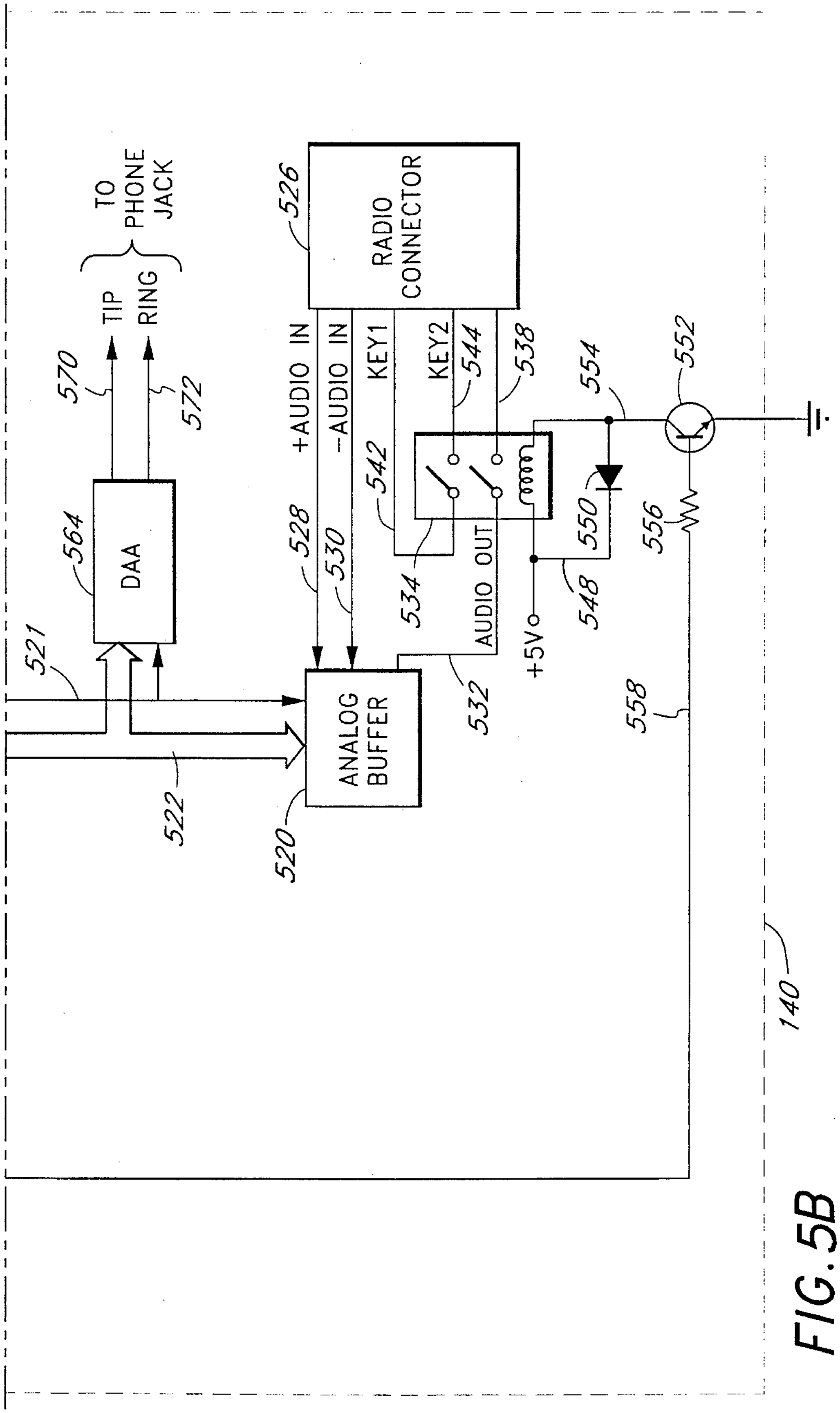

FIG. 5 is a high-level block diagram of the circuit of the decoder unit 140. The circuit comprises a microprocessor 501 (μP) that has an embedded one-time-programmable (OTP) ROM 502. The microprocessor 501 is preferably the same type of microprocessor used in the encoder unit 100. In the preferred embodiment, the microprocessor 501 is thus an 8751 8-bit microcontroller. As will be recognized by those skilled in the art, other types of microprocessors could be used in place of the 8751, including other microcontrollers in the 8051 family. Further, a customized application-specific integrated circuit could be used for the microprocessor 501. The OTP-ROM 502 holds executable code, including routines for receiving data and unscrambling encrypted codes. These routines will be described below in the section "Key Release Sequence-Decoder Unit."

A bus 503 connects the microprocessor 501 to the touch receptacle 164, the LEDs 156 on the front panel 142 (shown as 156*a–c* in FIG. 1), a memory array 504 (memory), a real time clock (RTC) 506, an optional alarm input 508, two microswitches 510, an alarm output 512, a stepper motor (including drivers) 514, a UART/MODEM 516, and a speech synthesizer 518 (with an internal ROM 519). The bus arrows shown with the bus 503 indicate the direction of data or signal flow between the microprocessor 501 and the respective devices 156, 164, 506, 508, 510, 512, 514, 516 and 518.

The memory 504 is preferably a 32K byte EEPROM (electrically erasable programmable read-only memory), which can be written to by the microprocessor 501 in blocks of 64 bytes. The memory 504 is used to hold certain non-executable data such as the list of authorized PINs and the decoder unit history file. The memory 504 is also used to store software updates. The RTC 506 is preferably a Dallas Semiconductor Time-In-A-Can.

The alarm input 508 is a general purpose input jack that is connected to a single port bit of the microprocessor 501. The alarm input 508 allows an output of an alarm or other device to be connected to the decoder unit 140. For example, an external panic button at a guard house can be connected to the alarm input 508, to allow the decoder unit 140 to trigger an alarm (through appropriate software routines) in the event of an emergency.

The microswitches 521 (also shown in FIGS. 11–14) are two mechanically-activated switches that are used to monitor the state of a lock 1115 (FIGS. 11–13) of the decoder unit 140. The lock 1115 secures the key 146 (FIG. 1) when in a locked state, and permits the key 146 to be rotated and removed when in an unlocked state. The first microswitch is connected to a dedicated port bit of the microprocessor 501, allowing the microprocessor 501 to sample the state of the lock 1115. The second microswitch is redundant of the first microswitch, and is connected to an output port (not shown) of the decoder unit 140 for user-defined applications. This second microswitch may be used, for example, to turn on a light when the lock 1115 of the decoder unit 140 is in an unlocked state, to indicate that the key 146 is not secured.

The microswitches 510 and lock 1115 of the decoder unit 140 are further described below in the section "Mechanical Features of Decoder Unit."

The alarm output 512 is a relay contact that connects a 5 V or other source to an output jack (relay and output jack not shown). In the preferred embodiment, the alarm output is used to permit the decoder unit 140 to trigger an external alarm if the key 146 (FIG. 1) has not been re-secured (i.e., inserted into the socket 144 and rotated to a locked position) within a pre-determined period of time. However, the alarm output can be programmably controlled to perform any of a variety of functions. For example, for vehicle installations, the alarm output 512 can be used to illuminate a flashing light whenever the key 146 is not secured.

Figure 6:
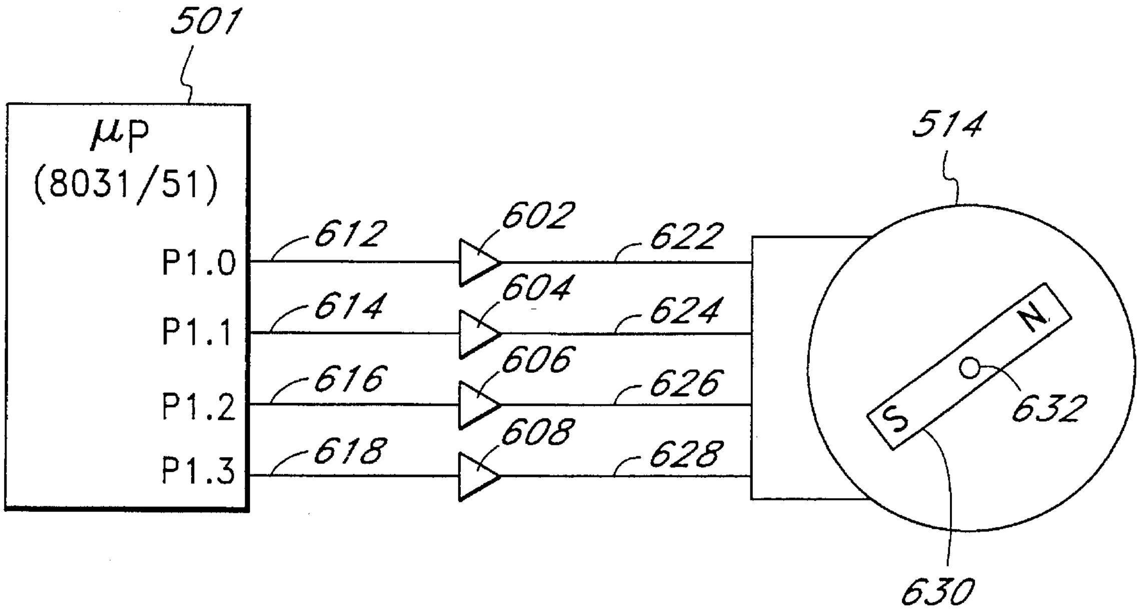
FIG. 6 illustrates the connection of the microprocessor of the decoder unit to the stepper motor of the decoder unit.

The stepper motor 524 controls the state of the lock 1115 (FIG. 11–13) of the decoder unit 140. A stepper motor that requires at least eight steps to perform one revolution is preferred for this purpose. The connection of the stepper motor to the microprocessor 501 is shown in FIG. 6, and will be described in the section that follows.

The UART/MODEM 516 can be a 73K222U, as is used with the encoder unit 100. Alternatively, the UART/MODEM 516 can be replaced with a MODEM, and the built-in UART of the 8751 microprocessor 501 can be used. The UART/MODEM 516 is connected to an analog buffer 520 and a data access arrangement circuit 564 (DAA) by a bus 522. The DAA 564 is connected to a tip line 570 and a ring line 572. The tip and ring lines 570, 572 are connected to a phone jack (not shown) on a rear panel of the decoder unit 140.

The analog buffer 520 can be identical to the analog buffer 220 of the encoder unit 100. The analog buffer 520 may be omitted for base decoder units that communicate with the encoder unit 100 solely via telephone connection.

The DAA 564 includes a circuit for detecting an off-hook condition of the telephone 178 (FIG. 1), and is otherwise identical to the DAA 264 of the encoder unit 100. The DAA 564 may be omitted from decoder units that will be installed within a vehicle.

The analog buffer 520 is connected to a radio connector 526 and a relay 534. The connection of the analog buffer 520, radio connector 526 and relay 534 are the same as described above for the encoder unit 100. The relay 534 is controlled by a dedicated port line 558. The circuit used to control the relay 534 (comprising a diode 550, a transistor 552, a resistor 556 and a 5 V source) is identical to the circuit described above for the encoder unit 100.

The circuit comprising the relay 534, diode 550, transistor 552 and resistor 556 is provided to permit the decoder unit 140 to transmit data (or handshaking signals) via RF. Although the system is preferably configured for simplex operation (for reasons discussed above), the inclusion of this circuit provides the option of half-duplex (i.e., two-way) RF operation.

The speech synthesizer 518 is connected to the analog buffer 520 and the DAA 564 by a line 521. In the preferred embodiment, the speech synthesizer 518 a μPD77P56 device available from NEC. The μPD77P56 has a built-in 256 k-bit ROM 519. The ROM 519 can hold up to approximately 16 seconds of digitized speech (depending upon the sampling rate used). The digitized speech held by the ROM 519 can be divided into a maximum of 256 addressable message segments (i.e., words, phrases, etc.), that can individually be selected for output by writing an 8-bit value to the speech synthesizer 518 on the bus 503. The speech synthesizer 518 outputs a pulse-width modulated voice signal on the line 521. The signal is passed through a first-order R-C filter (not shown) to produce an audio signal that may be transmitted via telephone or RF, or may be amplified and output over a local speaker.

A functional description of the decoder unit circuit of FIG. 5 will now be provided. A more detailed description of the steps taken when an encrypted code is received will be provided in the sections that follow. As will be apparent from the descriptions that follow, the decoder unit 140 can be programmed to perform a variety of functions, many of which can be customized for particular users.

The microprocessor 501 normally executes code only out of the OTP-ROM 502, but may execute code updates out of the memory 504. As with the encoder unit 100, code updates held by the memory 504 are written in an interpretive language, and thus require special decoding by the microprocessor 501 prior to execution. Interpretive instructions are written such that the contents of the embedded OTP-ROM 502 cannot be accessed.

During normal operation, the microprocessor 501 preferably remains in a loop in which it monitors the alarm input 508, the touch receptacle 164, the microswitches 510 and the UART/MODEM 516. The microprocessor 501 can monitor these devices 508, 164, 510, 516 by polling the devices, or by the use of interrupts.

If the microprocessor 501 detects the application of a touch device 166 (FIG. 1) to the touch receptacle 164, it reads the PIN of the touch device 166 to determine the type of touch device being applied. If the touch device 166 is a DS1991 multikey with password (used by the system as an identification key), the microprocessor 501 performs a read from the memory 504 to look up the password for the identification key 166, and transmits the password to the identification key 166 to unlock the identification key 166. If the password is correct, the microprocessor 501 reads and temporarily stores a PIN from the identification key 16 and then waits for a data transmission from the encoder unit 100. If a data transmission of a key release command is received within a fixed time after the application of the identification key 166, the PIN is compared with a list of authorized PINs stored in the memory 504.

Referring to FIGS. 1 and 5, data transmissions are sensed by the UART/MODEM 516, which senses the occurrence of a carrier tone on the phone line 176 or the cable 172. For base installations of the decoder unit 140, the UART/MODEM 516 listens for activity on the phone line 176 whenever the telephone 178 is off-hook (as sensed by the DAA 564 by monitoring the voltage between the tip line 570 and ring line 572). For mobile installations, the UART/MODEM 516 continuously monitors the activity on the frequency to which the RF receiver 170 is tuned. When a data transmission is detected, the decoder enters into a receive data routine (flowchart shown in FIG. 10), which will be described in the sections that follow.

As with the encoder unit 100, the DAA 564 of the decoder unit 140 performs ring detection. The decoder unit 140 can be programmed to answer an incoming call after a specified number of rings. A custom software routine can be provided to inform the caller (through data transmission, or using a voice status message generated by the speech synthesizer 518) of the status of the decoder unit 140. Voice status messages generated by the speech synthesizer 518 may additionally or alternatively be output over a local speaker, or may be transmitted over the radio. Status provided by the voice status message or data transmission may include, for example, the state of the lock 1115 (FIGS. 11–13), the identity of the person whose identification key 166 (FIG. 1) was used to release the key 146, and the time period for which the key 146 has been released.

The OTP-ROM 502 can include routines for servicing a variety of other conditions. For example, for base decoder units, a routine can be included to place a call to the dispatcher station (or other specified number) whenever the alarm input 508 goes high, or whenever an internal key release timer expires. A verbal warning message can then be output using the speech synthesizer 518 to inform the dispatcher of the condition. The warning message can alternatively be output as a data message to the encoder unit 100 or other computer.

6. Stepper Motor

Stepper motors are conventionally interfaced to a microprocessor using a stepper motor control chip. The stepper motor control chip generates sequences of logic values for rotating the rotor (by controlled fractions of a revolution or "steps") to a position specified by the microprocessor. A significant aspect of the present invention is the absence of a stepper motor control chip from the decoder unit 140, which forces the microprocessor 501 to generate the sequence of values necessary to open the lock 1115.

FIG. 6 illustrates the connection of the microprocessor 501 to the stepper motor 514. Port bits P1.0, P1.1, P1.2 and P1.3 of the 8751 are connected to the inputs of drivers 602, 604, 606 and 608 by lines 612, 614, 616 and 618 respectively. In the preferred embodiment, two SG1644 high speed dual MOSFET driver chips (available from Silicon General) are used for the drivers 602–608. The outputs of the drivers 602, 604, 606 and 608 are connected to the four control inputs of the stepper motor 514 by the lines 622, 624, 626 and 628 respectively. The stepper motor 514 has a rotor 630 that is connected to a shaft 632. The shaft 632 is connected to a latch gate 1114 (FIGS. 11–13) of the lock 1115 by a rack and pinion assembly 1126 (FIGS. 11–13), permitting the stepper motor 514 to unlock the lock 1115 and release the key 146.

In the preferred embodiment, a spring 1120 (FIG. 11) holds the rotor 630 at a fixed starting position. When the rotor 630 is at this starting position, the lock 1115 is locked, and the key 146 (FIG. 1) cannot be removed from the socket 144 (FIG. 1). The stepper motor 514 is mechanically coupled to the lock 1115 such that the rotor 630 must be rotated by ¾ of a revolution from the starting position (against a biasing force generated by the spring 1120) to unlock the lock 1115 and release the key 146. In the preferred embodiment, the stepper motor 514 requires 48 steps to make a full revolution, and the stepper motor 514 must go through a minimum of ¾×48=36 steps for the lock 1115 to be opened. Thus, the microprocessor 501 must toggle the port lines P1.0–P1.3 through a sequence of at least 36 4-bit values to open the lock 1115.

As will be recognized be one skilled in the art, the absence of a stepper motor control chip significantly reduces the likelihood that the key 146 will be released in the event of a microprocessor failure or program bug. Even if the microprocessor 501 were to go into a state wherein the port bits P1.0–P1.3 are randomly toggled, the probability of the microprocessor 501 generating the proper sequence of values to open the lock 1115 is extremely low. Since this probability is inversely related to the minimum number of values that must be generated by the microprocessor to open the lock, and thus the number of stepper motor steps required to unlock the lock, the probability can be reduced generally by using a stepper motor that requires a large number of steps per revolution, and/or by mechanically coupling the stepper motor to the lock so that a large number of steps are required to open the lock. The probability of an erroneous opening is further reduced in the preferred embodiment by the use of the spring 1120 (FIG. 11), which returns the stepper motor 514 to the starting position if a value of $0000_2$ or $1111_2$ is driven out on the port lines 612, 614, 616, 618.

In the preferred embodiment of the decoder unit software, once the rotor 630 has been rotated to the proper position to release the key 146, the last value written to P1.0–P1.3 is held on the output lines 612–618 for a preprogrammed period of time or "release window" to maintain the lock 1115 in an unlocked state. After release window expires, the microprocessor 501 outputs a value of either $0000_2$ or $1111_2$ on the port lines 612–618, allowing the rotor 630 to spin freely, and thus enabling the spring 1120 (FIG. 1) to return the rotor 630 to the starting (i.e., locked) position. If the key 146 is removed (or rotated to an unlocked position) at the end of the release window, a cam 1108 (FIGS. 11–13) of the lock 1115 blocks the latch gate 1114, preventing the lock 1115 from returning to a locked state until the key 146 is reinserted and rotated to a locked position. The operation of the lock 1115 is further described below in the section "Mechanical Features of Decoder Unit."

The use of a stepper motor as described above provides significant advantages over prior art systems that employ an electrical solenoid to control the lock. For example, since the microprocessor 501 must step the stepper motor through a certain minimum sequence to open the lock 1115, the probability of a failure that causes a key release is significantly reduced over solenoid-based systems. Additionally, stepper motors are less susceptible to either electrical or mechanical shock than solenoids.

7. Key Release Sequence-Encoder Unit

The encoder unit 100 sends key release commands to decoder units by transmitting an encrypted code that contains: (1) a station code field that uniquely identified a target decoder unit (or a group of decoder units), and a command code that specifies a function to be performed by the target decoder unit. The command code will typically be a key release command, but may alternatively be a code (i.e., software) update command (in which case a code update may additionally be transmitted as part of the encrypted code), or may be a command for performing a user-customized function.

Figure 7:
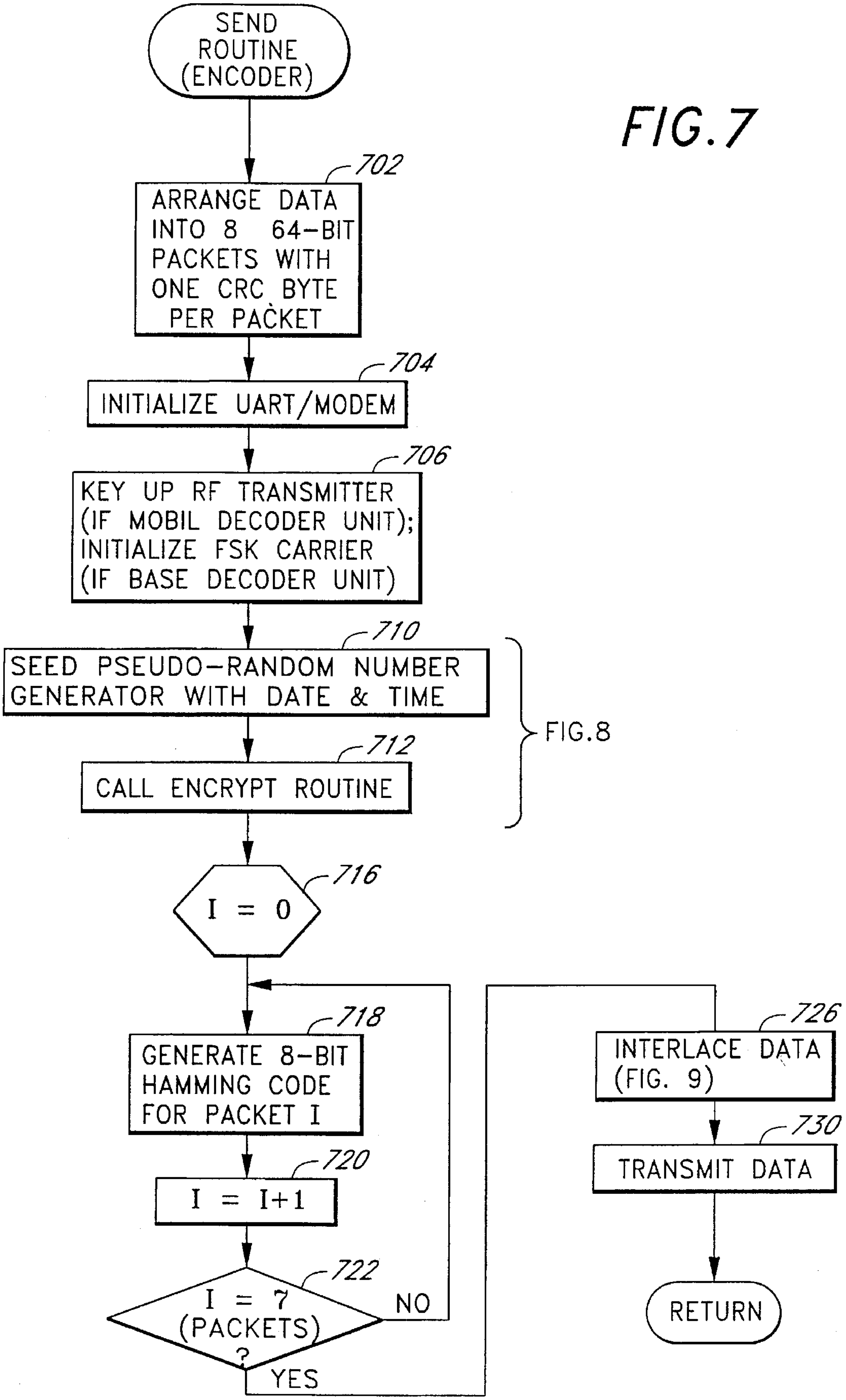
FIG. 7 is a flow chart for a preferred encoder unit routine for generating and transmitting an encrypted code.

FIG. 7 is a flow chart for a preferred send routine used by the encoder unit 100 to generate and send an encrypted code. The send routine is called once the dispatcher has selected a target decoder unit (by specifying the station code for the decoder unit), and has specified a command to send to the target decoder unit. The dispatcher selects the target decoder unit and command using the keypad 104 (FIG. 1) of the encoder unit 100.

Referring to the process block 702, the encoder unit 100 arranges the station code and command field data into eight 64-bit packets. One byte of each packet is a CRC byte for that packet (generated by the encoder unit 100), which is used by the decoder unit 140 to determine whether or not the encrypted code has been properly decrypted. Any format can be used for arranging the data and CRC into the packets.

Referring to the process blocks 704 and 706, the microprocessor 201 (FIG. 2) initializes the UART/MODEM 216, and then either keys up the RF transmitter 114 (FIG. 1) or initializes an FSK carrier. If the target decoder unit is installed within a vehicle or (as determined using a look-up table stored in the RAM 206), the microprocessor 201 keys up the RF transmitter 114 by writing a "1" to the port bit to which the line 258 (FIG. 2) is connected. This step is also performed if the target decoder unit is hardwire-connected to the encoder unit 100. If the target decoder unit is installed at a fixed site and connected to a telephone line, the microprocessor 201 initiates an FSK carrier tone on the telephone line 120 (FIG. 1).

Figure 8:
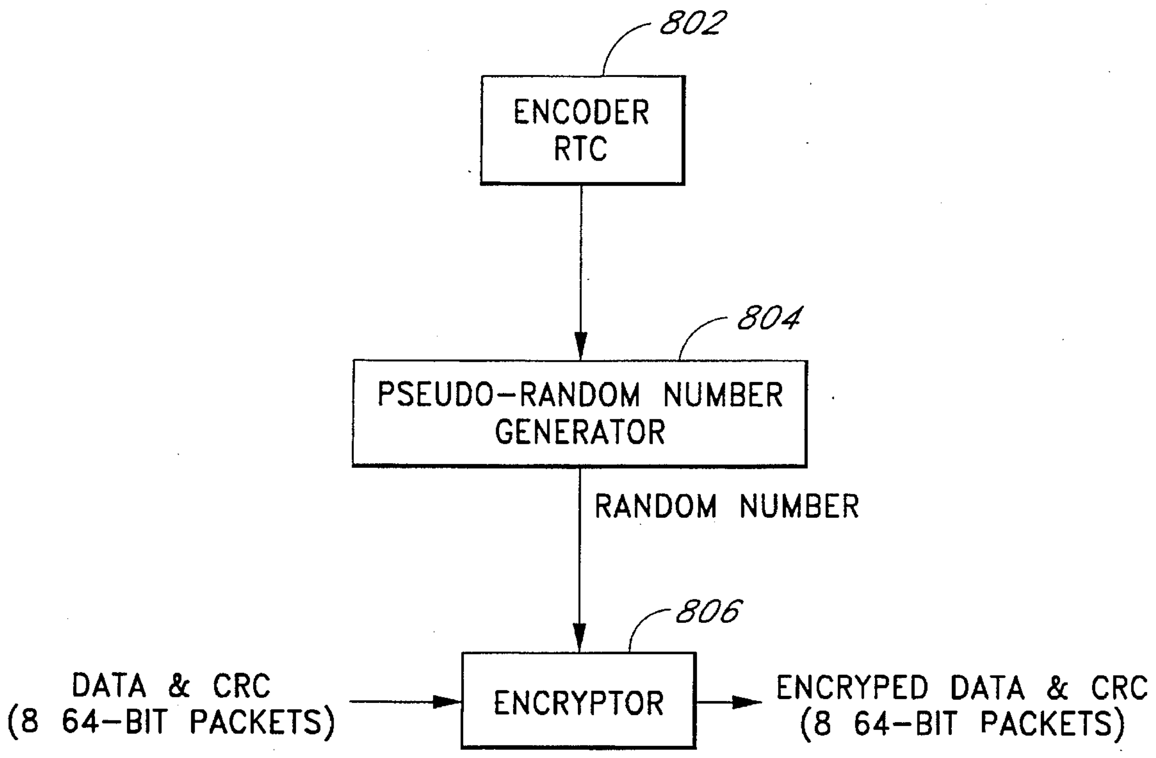
FIG. 8 pictorially illustrates a preferred method for encrypting data for transmission.

Referring to the process blocks 710 and 712, the encoder unit then encrypts the eight 64-bit data/CRC packets. The method used to encrypt the packets is illustrated pictorially in FIG. 8. Referring to the blocks 802 and 804 in FIG. 8, the current date and time (to a granularity of one second) held by the encoder RTC 212 (FIG. 2) are used to seed a pseudo-random number generator to a known starting point. The pseudo-random number generator is implemented through software. Referring to the block 806, the random number generated by the pseudo-random number generator is then used to select one of a plurality of encryption algorithms (or variations of a single encryption algorithm) for encrypting the data or "code" to be transmitted. Since an RTC granularity of one second is used, the encryption algorithm changes every second.

Numerous algorithms for encrypting data are known in the art, any of which can be used for this purpose. In the preferred embodiment, the algorithm comprises the step of exclusive-ORing the code with a pattern of ones and zeros to encrypt the code. The encrypted code can then be decrypted by the decoder unit by exclusive Oring the encrypted code with the same pattern used for encryption. Any pattern of 64×8=512 ones and zeros can be used for this purpose. Thus, as many as $2^{512}$ different encryption "algorithms" can be used by merely varying the 512-bit pattern with the output of the pseudo-random number generator. The 512-bit pattern can be derived, for example by concatenating the 512/X consecutive numbers that follow the pseudo-random number, where X is the number of bits of the random number.

As will be described in the section that follows, decoder units that receive an encoded transmission use their respective RTCs to select the proper decryption algorithm for decrypting the code. Thus, provided that the RTC of a decoder unit is synchronized (within a certain tolerance range) to the RTC 212 of the encoder unit 100, the decoder unit will successfully decrypt the encrypted code.

Encryption of the code by this method prevents an unauthorized user from making a copy of a transmitted code (by tape recording, for example), and then subsequently using the copied code to release a key. To generate a valid key release code, the unauthorized user would have to know the specific encryption/decryption algorithm that would be used by the system at the time of transmission. This technique of varying the encryption algorithm thus significantly increases the level of security attained by the system.

Referring to the blocks 716–722, once the data has been encrypted, the encoder unit 100 generates an 8-bit Hamming code for each of the eight 64-bit packets. The Hamming code allows for the detection and correction of all single-bit errors, and allows for the detection of all 2-bit and most 3-bit and 4-bit errors. Routines for generating Hamming codes are well known in the art, and thus will not be described herein. Once 8-bit Hamming codes have been generated for each of the eight packets, each packet consists of 64 encrypted data/CRC bits and 8 bits of Hamming code.

Figure 9:
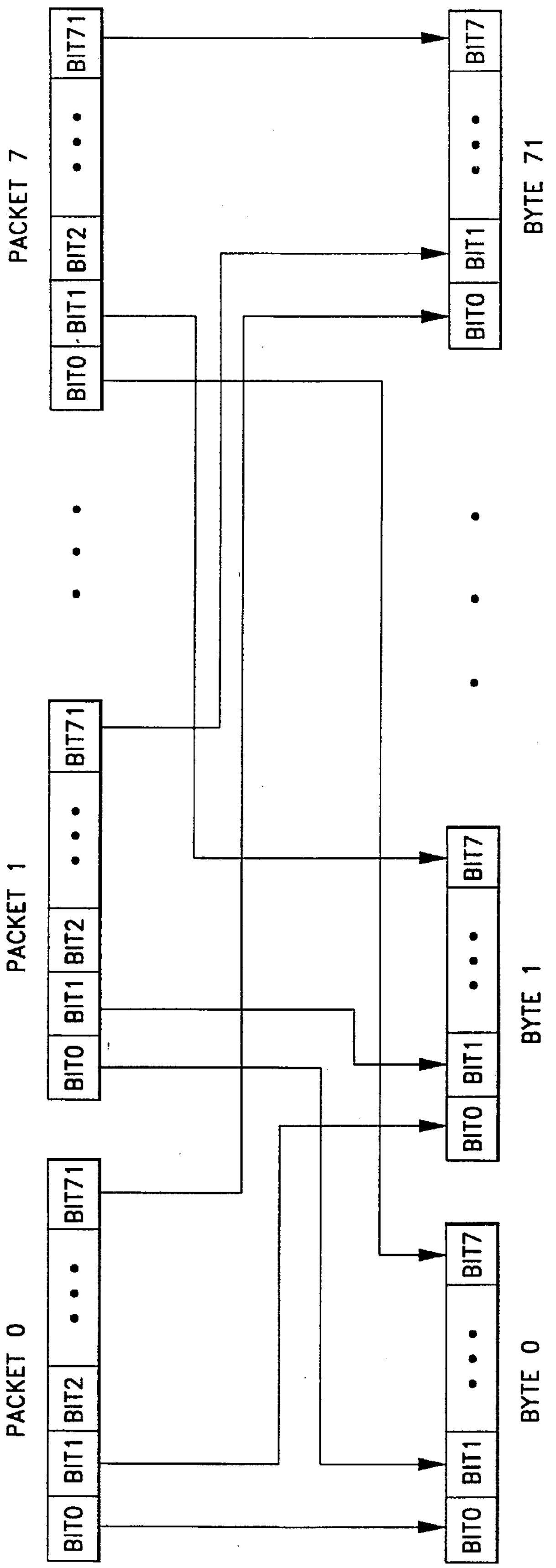
FIG. 9 pictorially illustrates an interlace method of the present invention for rearranging data prior to transmission to improve error-correction capabilities of the system.

Referring to the process block 726, the bits of the eight 72-bit packets are then interlaced for transmission. The manner in which the bits are interlaced is illustrated pictorially in FIG. 9, with the arrows indicating the rearrangement of the bits of packets 0–7 into bytes 0–71. The packets are rearranged such that byte 0=[p0/b0 (i.e., packet 0, bit 0), p1/b0, p2/b0, p3/b0, p4/b0, p5/b0, p6/b0, p7/b0], byte 1=[p0/b1, p1/b1, p2/b1, p3/b1, p4/b1, p5/b1, p6/b1, p7/b1], and so on.

Arrangement of the packet data in this manner permits full error correction in the event that as many as eight consecutive bits are lost during data transmission. If for example, all eight bits of byte 1 (FIG. 9) are inverted in the transmission process (as the result of a communications glitch, for example), only one bit from each of the eight packets is lost. Since the Hamming code bytes of each packet permit correction of all single-bit errors, all eight single-bit errors can be corrected. Since burst errors (i.e., errors occurring in multiple consecutive or nearby bit positions) are common when digital data is transferred over an RF or telephone channel, a significant increase in reliability is obtained by interlacing data in this manner.

Referring to the process block 730 of FIG. 7, the 72 bytes of interlaced data are then transmitted (via telephone or RF).

8. Key Release Sequence-Decoder Unit

Figure 10:
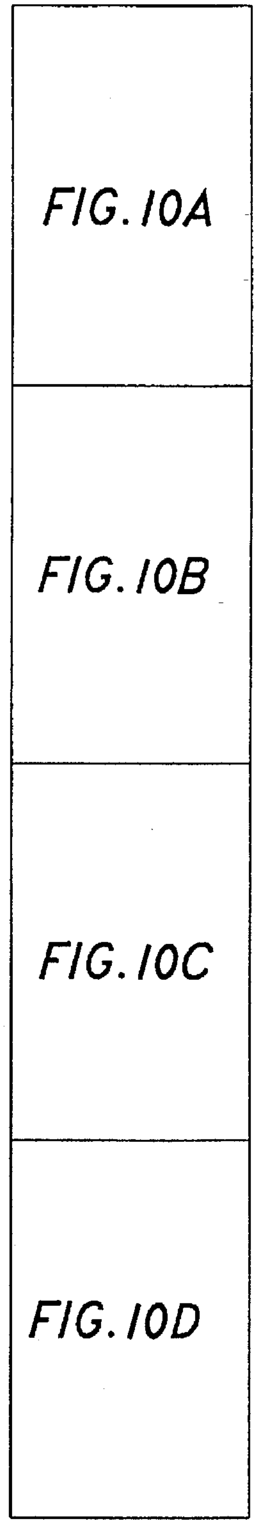
FIG. 10, consisting of FIGS. 10A–10D, is a flow chart for a preferred decoder unit routine that is executed when a transmission is received from an encoder unit.
Figure 10A:
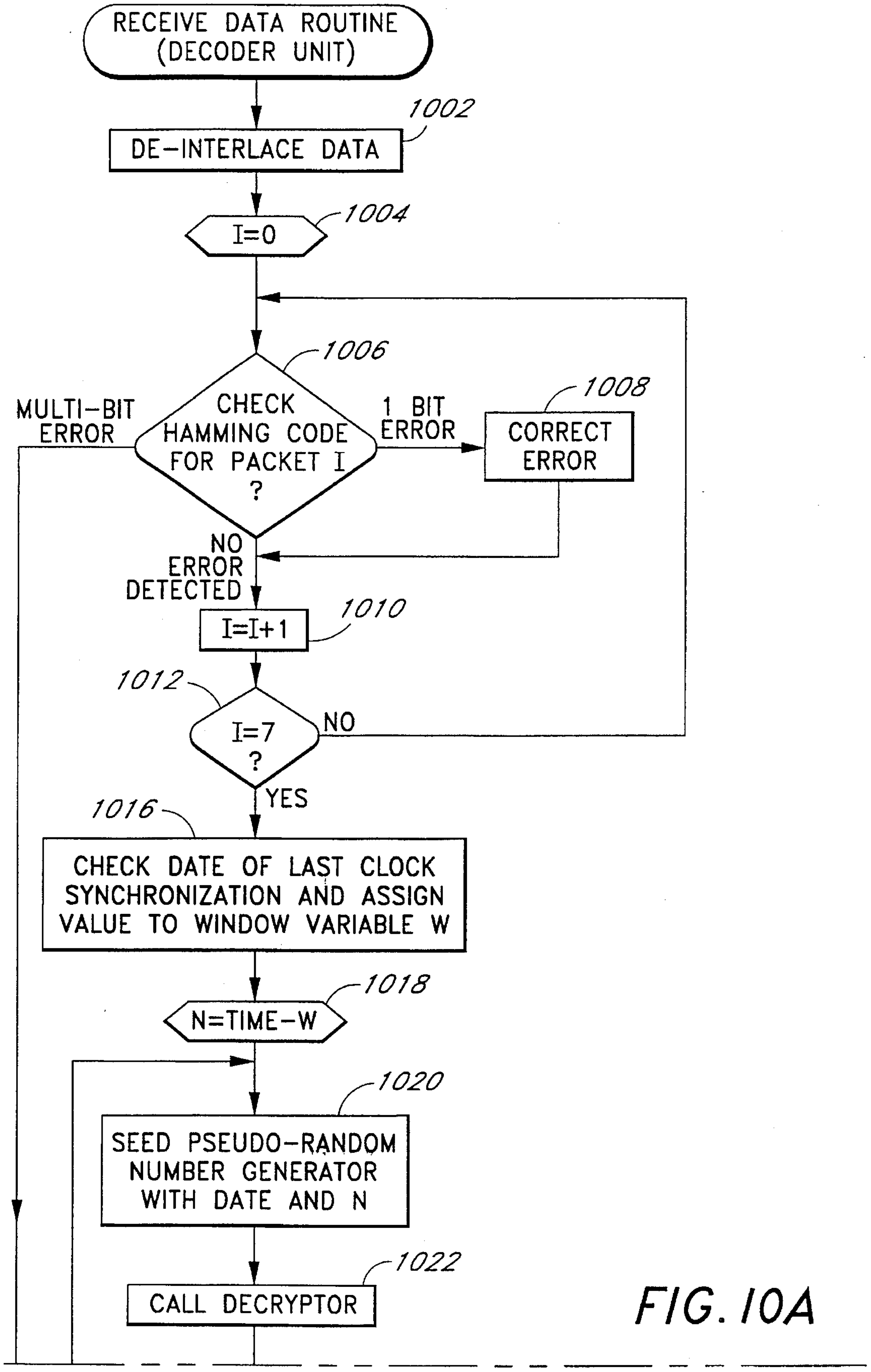
Figure 10B:
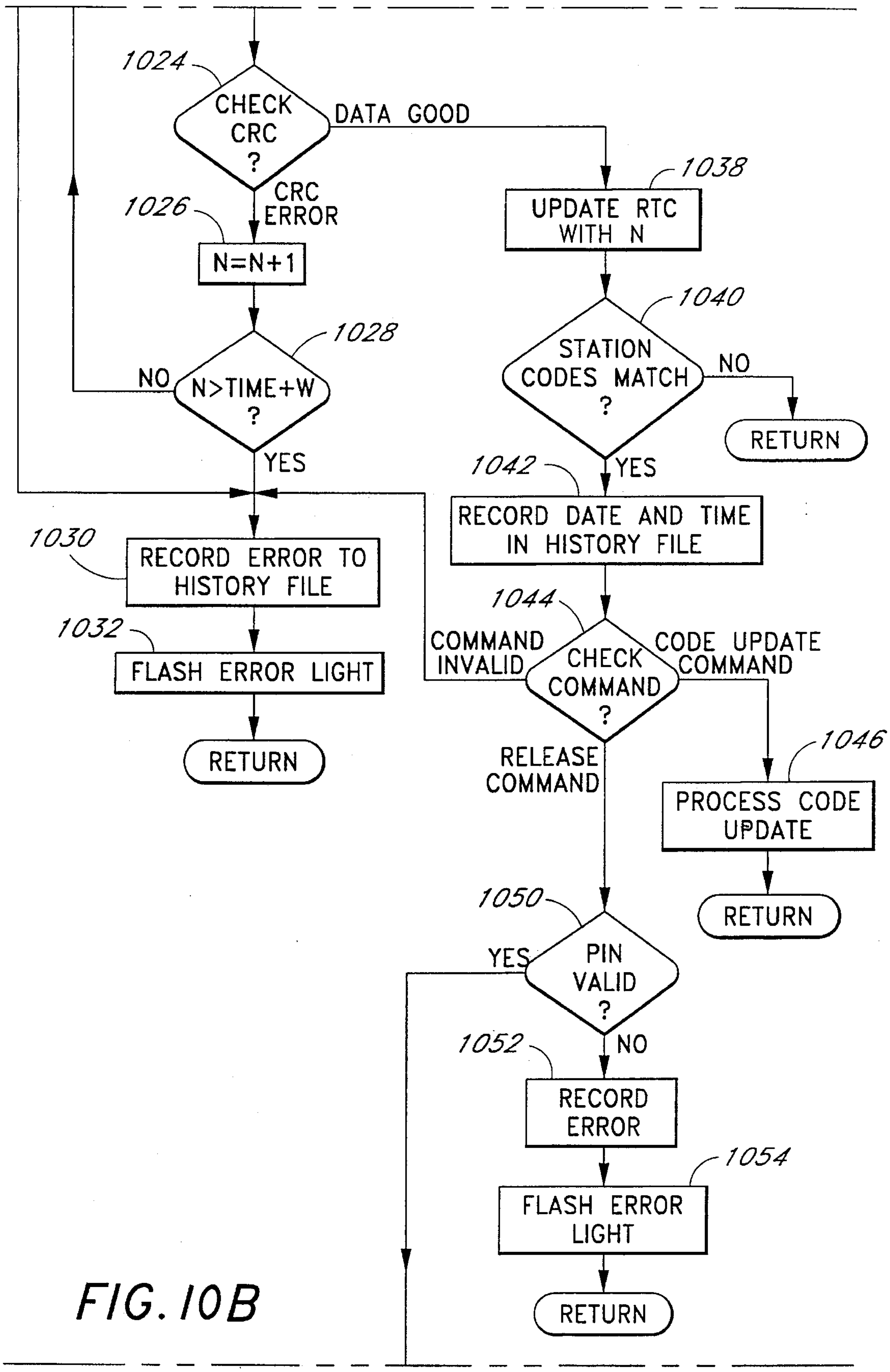
Figure 10C:
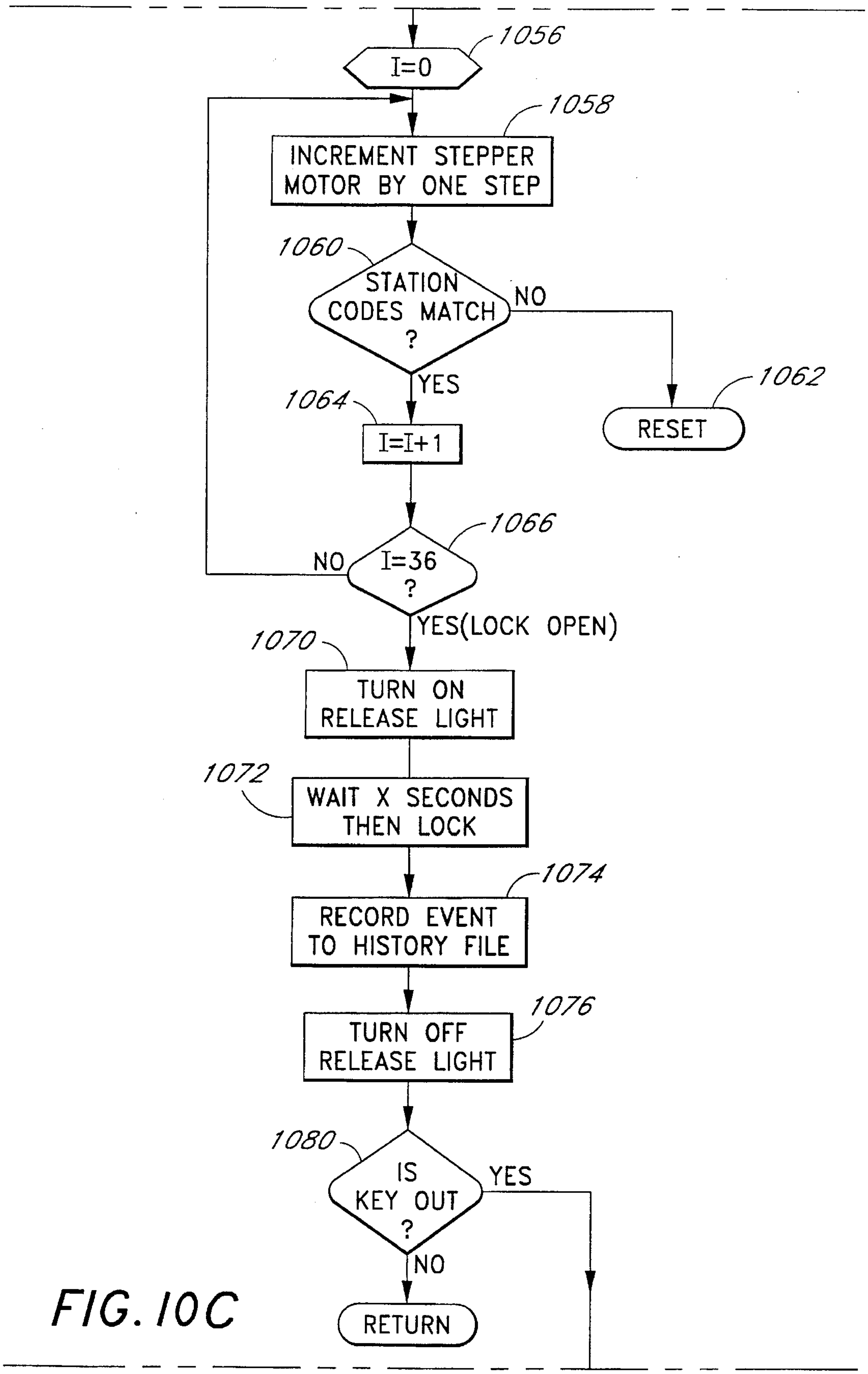
Figure 10D:
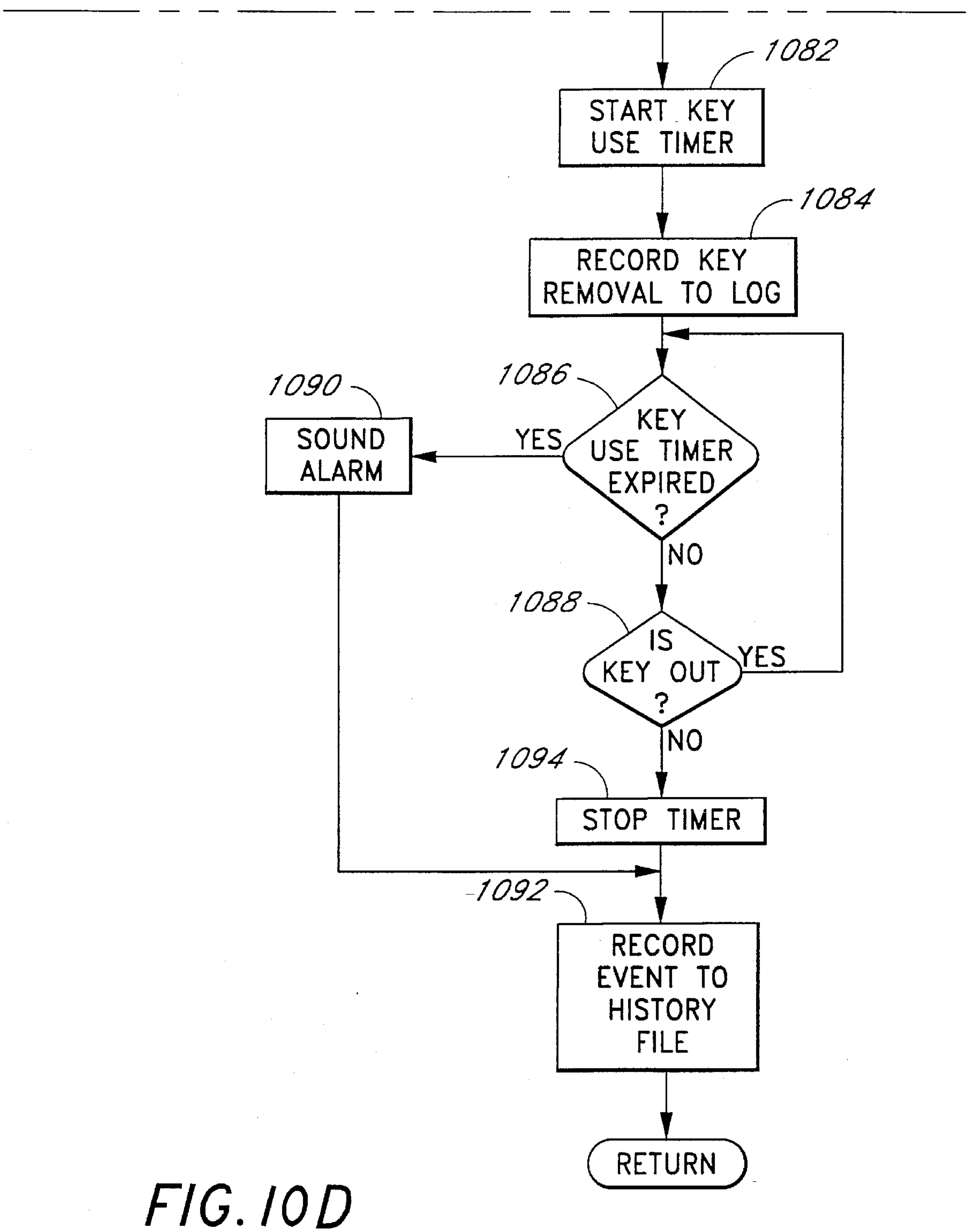

FIG. 10 shows a flow chart for the receive data routine that is executed by the decoder unit 140 whenever a data transmission is received. The routine performs the basic functions of: (1) decrypting the data received, (2) synchronizing the RTC 506 with the RTC 212 of the encoder unit 100, and (3) if the station code contained in the data transmission matches the station code of the decoder unit 40, performing the command specified by the data transmission. The routine illustrated in FIG. 10 can perform either a key release command or a code update command.

Referring to the process block 1002, the decoder unit 140 initially de-interlaces the data it receives. This is done by rearranging the data bits of bytes 1–71 (FIG. 9) into the original packets 0–7 that existed prior to interlacing. Referring to the blocks 1004–1012, the decoder unit 140 then checks the 8-bit Hamming code for each of the eight packets. If a single-bit error in a packet is detected in the decisional block 1006, the error is corrected, the program proceeds to the next packet. If a multiple-bit error is detected, the program branches ahead to the process blocks 130 and 132, where the program records the error to the decoder unit history file, and flashes the error light **156*b* (FIG. 1) on the front panel 142**.

Referring to the process block 1016, if no multiple-bit errors are detected the program checks the decoder unit history file to determine the date of the last RTC synchronization. Based on this date, and the drift specifications for the RTCs 212 and 506, the program assigns a value to a window variable W. This window variable is the allowable difference (in seconds) between the RTC 212 of the encoder unit 100 and the RTC 506 of the decoder unit 140. As will be seen if the RTC 212 and the RTC 506 are out of synchronization by more than W seconds, the decoder unit 140 will not be able to decrypt the data. The window variable W is set to a value that is directly proportional to the amount of time since the most recent synchronization of the RTC 506 of the decoder unit 140, to thereby allow for a greater discrepancy when the RTC 506 has not recently been synchronized.

Referring to the block 1018, the program sets a time variable N to TIME–W, where TIME is equal to the time value held by the RTC 506 (in seconds) upon receipt of the data transmission. Referring to the process blocks 1020 and 1022, the program then seeds the a pseudo-random number generator with the current data and N, and attempts to decrypt the data. The pseudo-random number generator is identical to the pseudo-random number generator used by the send routine of the encoder unit 100, and will thus generate the same random number used for encryption if N is equal to the RTC 212 value used for encryption. Referring to the block 1022, if the random number generated in the block 1020 is equal to the random number used for encryption, the decryptor routine will select the correct decryption algorithm (or exclusive 0R pattern).

Referring to the decisional block 1024, the program then checks the 8 CRC bits of each packet to determine whether or not decryption was successful. If not, the program increments N by one second, as indicated by the process block 1026.

Referring to the decisional block 1028, the program then compares N to its maximum value of TIME+W. If N≦TIME+W, the program branches back to the block 1020 and re-attempts decryption with the new value for N. If N>TIME+W, indicating that the RTC 516 time value is not equal to the RTC 212 time value±W seconds, the program records the error to the decoder history file and flashes the error light **156*b*, as indicated by the blocks 1030 and 1032**.

If the CRC check is good in the decisional block 1024, indicating that data has been properly decrypted, the decoder unit 140 updates the time value held by its RTC 516 to N, as indicated by the process block 1038. All decoder units that successfully decrypt a data transmission thus use the transmission to synchronize their respective RTCs with the RTC of the encoder unit 100. For a mobile decoder unit, clock synchronization may thus occur several times a day, even though no key release command is sent to the particular decoder unit. The same is true if multiple decoder units are hardwire-connected to an encoder unit, or if multiple decoder units are connected to a common telephone line.

For base installations wherein a single decoder unit is connected to a single phone line, clock synchronization can advantageously be performed on a periodic basis through the encoder unit 100 software. For example, the encoder unit 100 can be programmed to periodically (e.g., once a week) place a call to the base decoder units of the system to which no key release command has recently been transmitted. Clock synchronization can thereby be maintained for decoder units of the system that are infrequently used.

Referring to the decision block 1040, the decoder unit 140 compares the station code specified by the encrypted transmission to its station code. As discussed above, each decoder unit 140 has a station code that is stored in its OTP-ROM 502. Although each decoder unit 140 of the system will typically have a unique station code, for certain applications it may be desirable to have two or more decoder units that share a common station code. Multiple keys can thereby be released simultaneously. If the station codes do not match, the program returns from the routine and waits for the next data transmission.

Referring to the process block 1042, if the station codes match, the decoder unit 140 records the date and time of the clock synchronization in its history file. As discussed above with reference to the block 1016, this data will be used upon the following transmission to set the window size for decryption. The program then decodes the command field, as indicated by the decision block 1044. The block 1044 is shown as checking for either a code (i.e., software) update command or a key release command. However, it should be understood that the software can be written to process other types of commands as well. For example, the software can be written to support commands for updating the list of authorized users of the decoder unit 140.

If the command specified in the command field is invalid, the program branches to the process block 1030 to record the error in the history table. If a code update command is specified in the command field, the program proceeds to process the code update, as indicated by the process block 1046. This involves writing a code portion of the eight 64-bit packets to the memory 504. Once the code update has been performed, the program returns from the routine.

If a key release command is specified in the command field, the program compares the PIN read-in from the identification key 166 (FIG. 1) with a list of valid PINs stored in the memory 504 (FIG. 5), as indicated by the decisional block 1050. If the PIN is not valid, the program records the error to the history file and flashes the error light **156*b*, as indicated by the process blocks 1052 and 1054**. The program then returns from the routine.

If the PIN is valid, the program enters into a sequence to rotate the stepper motor 514 the requisite number of steps to open the lock 1115, as indicated by the blocks 1056–1066. For the flowchart shown, the stepper motor 514 must be rotated by 36 steps to unlock the lock 1115. As described above, a value is written out on the microprocessor port lines P1.0–P1.3 to produce each individual step.

As indicated by the decision block 1060, the program re-compares the station codes after each step of the stepper motor 514. This is done to ensure that the lock 1115 will not be opened if the microprocessor 501 erroneously branches to this portion of the program. If a station code mismatch occurs, the program generates a decoder unit reset as indicated by the block 1062.

Once the stepper motor 514 has been rotated by 36 steps, the latch gate 1114 (FIGS. 11–13) of the lock 1115 is in the unlocked position, and the key 146 can be rotated and removed from the socket 144 (FIG. 1). Referring to the process blocks 1070 and 1072, the program turns on the release light **156*c* (FIG. 1), and then waits for a preprogrammed release window of X seconds (e.g., 10 seconds) for the key 146 to be removed. During this time, the microprocessor 501 continues to drive P1.0–P1.3 with the value corresponding to the 36th step to maintain the lock 1115 in the unlocked position. After X seconds, the microprocessor 501 drives the lines P1.0–P1.3 to $0000_2$ (or $1111_2$). If the key 146 in inserted within the socket 144 (FIG. 1) and rotated to the locked position at this time, the spring 1120 (FIG. 11) rotates the motor 514 to the starting (i.e., locked) position. If the key 146 is removed (or rotated to the unlocked position) at the expiration of the release window, the cam 1108 (FIGS. 11–13) holds the lock 1115 in the unlocked position until the key 146 is reinserted into the socket 144** and rotated to a locked position.

Referring to the process blocks 1074 and 1076, the program records the event to the history file. The program also turns off the release light **156*c***.

Referring to the decision block 1080, if the key 146 was not rotated to the unlocked position during the release window (as determined by reading the appropriate microswitch 510 at the end of the release window), the program returns from the routine. If the key 146 was removed (or rotated to an unlocked position and left in-place), the program starts the key use timer and records the removal of the key 146 to the history file, as indicated by the process blocks 1082 and 1084. The program then enters into a loop represented by the decision blocks 1086 and 1088, wherein the program repetitively checks the key use timer and checks for the return of the key 146. If the key use timer expires before the key 146 is returned and rotated to the locked position, the microprocessor 501 writes a high value to the alarm output 512 (FIG. 5) to sound an external alarm, as indicated by the process block 1090. The event is then recorded in the history file, as indicated by the process block 1092, and the program returns from the routine.

Referring to the process blocks 1094 and 1092, if the key 146 is re-inserted prior to the expiration of the key use timer, the timer is stopped and the event (i.e., the time of the key return) is recorded to the decoder history file. The program then returns from the routine.

9. Mechanical Features of Decoder Unit

Figure 12:
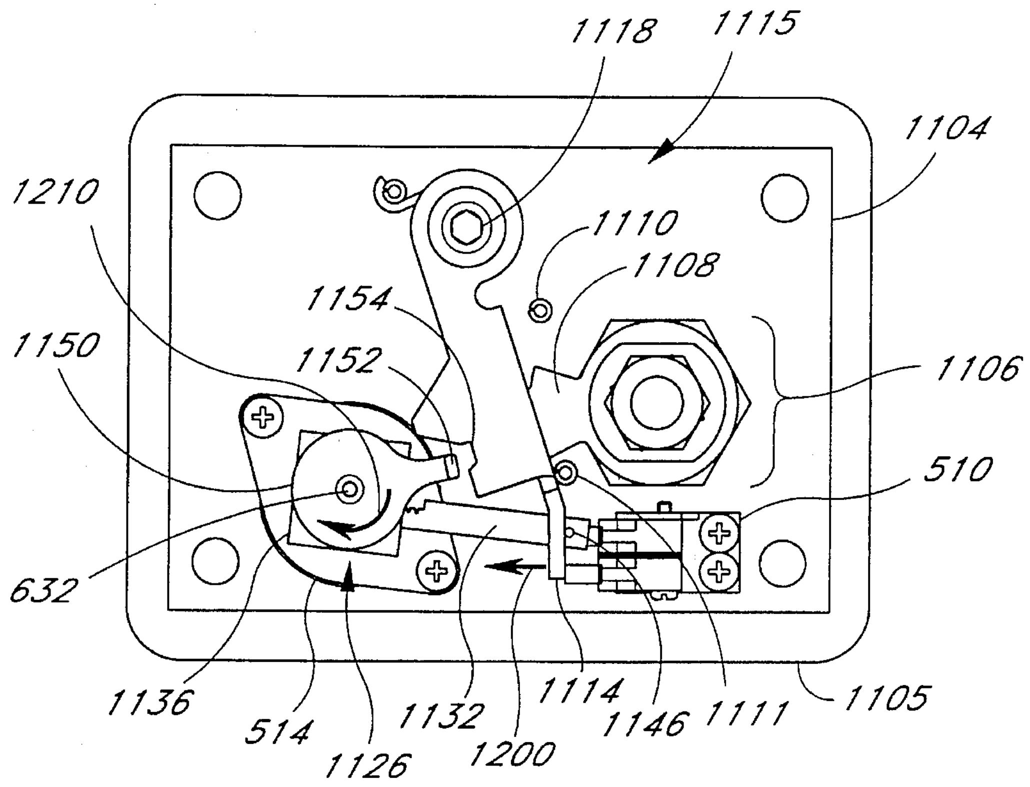
FIG. 12 is a plan view of the components shown in FIG. 11 with the decoder unit in a locked state to prevent removal of an access key.
Figure 13:
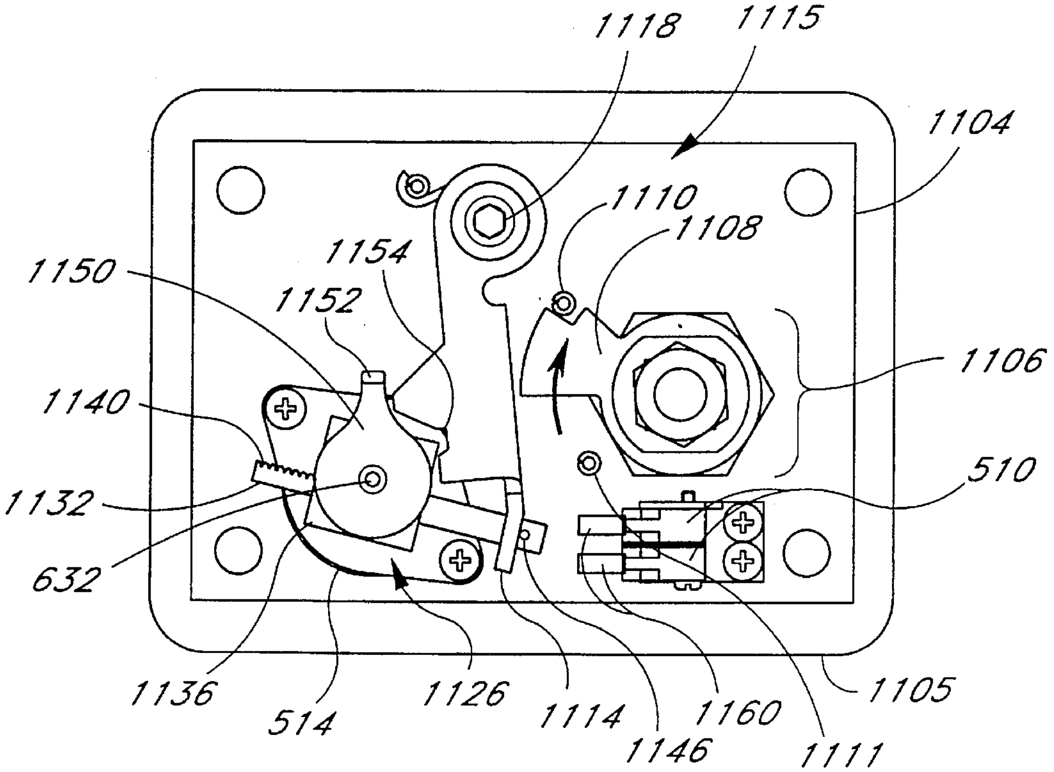
FIG. 13 is a plan view of the components shown in FIG. 11 with the decoder unit in an unlocked state.
Figure 11:
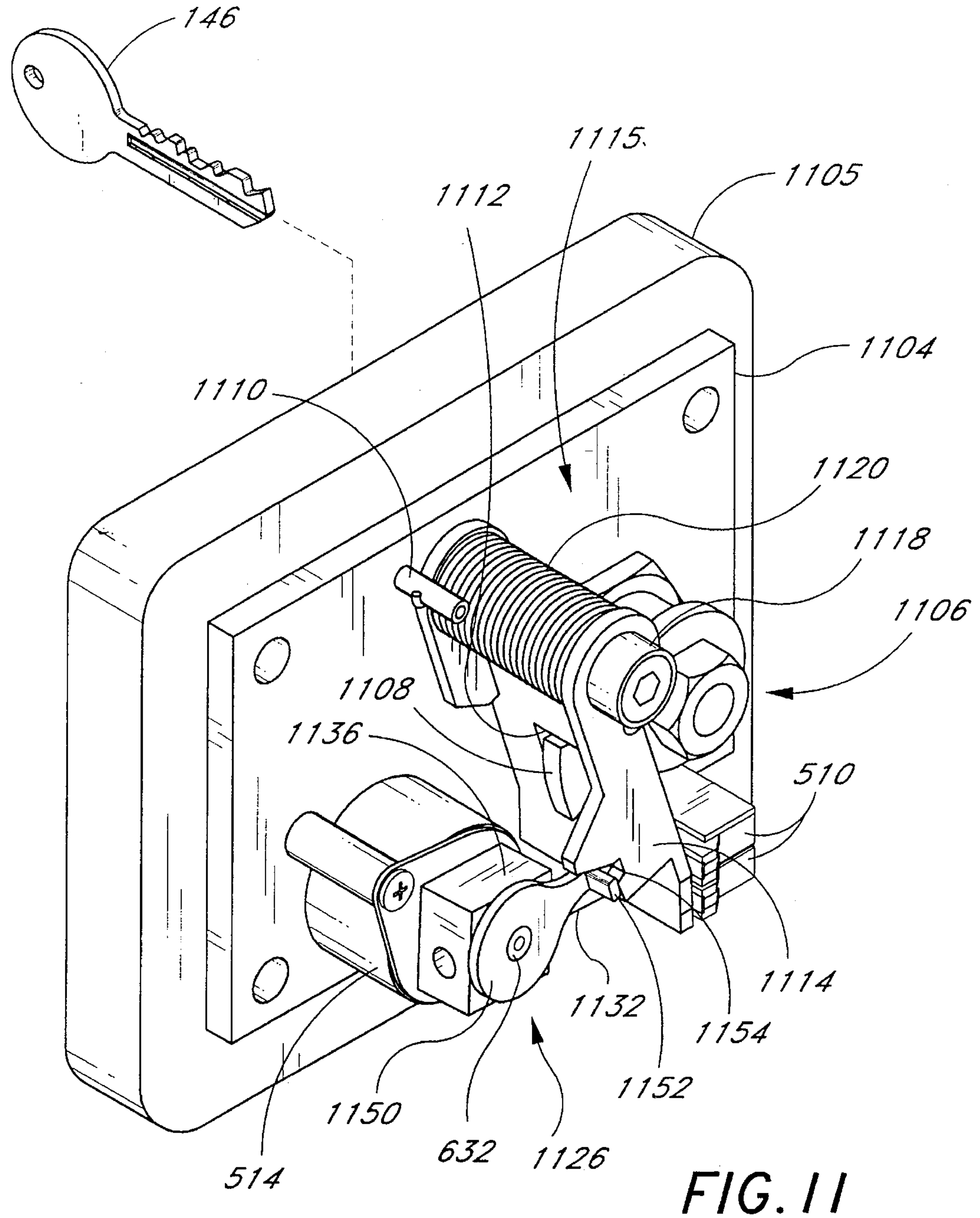
FIG. 11 is a perspective view of the internal mechanical components of the decoder unit of FIG. 1.

FIGS. 11–14 illustrate the mechanical components of the decoder unit 140 that control the release of the key 146 and the activation of the microswitches 510. FIGS. 11 and 12 illustrate these components with the lock 1115 in a locked or secure state, such that the key 146 cannot be removed from the socket 144 (FIG. 1). FIG. 13 illustrates these components with the lock 1115 in an unlocked state (i.e., with the latch gate 1114 in an unlocked position that permits the key 146 to be rotated), and with the key socket 144 rotated to an unlocked position.

Referring to FIG. 11, a metallic hard plate 1104 is attached to the back surface of a front plate 1105. The front surface of the front plate 1105 has the front panel 142 mounted thereon, as shown in FIG. 1. Hardware components used to connect the plates 1104 and 1105 to the housing of the decoder unit 140 are not shown.

Referring to FIGS. 11–13, the lock 1115 comprises a conventional key-activated cam-lock 1106, such as a Medeco camlock, a mortis cylinder, or a profile cylinder lock. The cam-lock 1106 serves as a key capture device for securing the key 146 by its coded portion. The cam-lock 1106 has a pinned lock core (not shown) that may be rotated within a cylinder (not shown) when the corresponding key 146 is inserted within the socket 144 (FIG. 1) of the cam-lock 1106. The cam 1108 of the cam-lock 1106 rotates with the lock core when the key 146 is turned. The key 146 can be withdrawn from the socket 144 of the cam-lock 1106 only when the lock core is rotated to an unlocked position (FIG. 13). Stops 1110 and 1111 limit the angular rotation of the cam 1108.

The lock 1115 also includes the latch gate 1114, which is pivotally mounted on a bolt 1118. As best shown in FIG. 11, a portion of the cam 1108 extends through an opening 1112 of the latch gate 1114 when the lock 1115 is in a locked or "secure" state, preventing the cam 1108 from being rotated to an unlocked position, and thereby preventing the removal of the key 146. A torsion spring 1120 (FIG. 11) seated along the bolt 1118 generates a biasing force that biases the latch gate 1114 in a counterclockwise direction from the viewpoint of FIGS. 12 and 13, urging the lock 1115 to a secure state.

A rack and pinion assembly 1126 is mounted to the shaft 632 of the stepper motor 514. The rack and pinion assembly 1126 comprises rack 1132 that passes through a hollow portion of a guide 1136. The rack 1132 has teeth 1140 (FIG. 13) that engage with teeth of a pinion gear (not shown) which is mounted on the shaft 632 of the stepper motor 514, so that the position of the rack 1132 relative to the guide 1136 changes when the shaft 632 of the stepper motor 514 rotates. In an alternative embodiment, the rack and pinion assembly 1126 is replaced with a cable and pulley assembly. In yet another embodiment, the rack and pinion assembly 1126 is replaced with a bell crank and push rod.

As best shown by FIGS. 12 and 13, the rack 1132 slidably extends through an opening in the latch gate 1114 (opening not shown). A pin 1146 that extends through a hole in the rack 1132 prevents the rack 1132 from being withdrawn from the opening in the latch gate 1114, thereby permitting the stepper motor 514 to adjust the position of the latch gate 1114 (against the biasing force of the spring 1120).

A relocker 1150 is fixedly attached to the shaft 632 at the end of the shaft 632. The relocker 1150 has a finger portion 1152 that is adapted to fit within an indentation 1154 in the latch gate 1114. The relocker 1150 serves to obstruct the latch gate 1114 from moving to an unlocked position when the relocker 1150 is in the position shown in FIGS. 11 and 12, as further discussed below.

Figure 14:
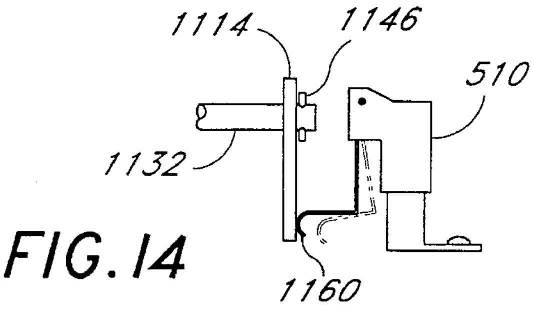
FIG. 14 is a side view of the microswitches shown in FIGS. 5 and 11–13.

Referring to FIGS. 13 and 14, the microswitches 510 are conventional mechanically-activated switches having activation levers 1160. The microswitches 510 are mounted such that the latch gate 1114 contacts and pivots the levers 1160 (as shown in phantom in FIG. 14) when the latch gate 1114 is in the position shown in FIGS. 11 and 12.

The operation of the key release mechanism will now be described. Referring to FIGS. 11 and 12, when no electrical stimulus is applied to the stepper motor 514, the force generated by the spring 1120 (FIG. 11) holds the latch gate 1114 in the locked position, preventing the cam 1108 from being rotated and thus preventing the key 146 from being removed from the socket 144 (FIG. 1). The latch gate 1114 presses against the activation levers 1160 so as to maintain the microswitches 510 in an "on" state. With the latch gate 1114 in this position, the relocker 1150 is held in a position (via the pin 1146, rack 1132, pinion gear, and motor shaft 632) such that the finger 1152 is positioned near the indentation 1154. With the relocker 1150 rotated to this position, the finger 1152 serves to obstruct the latch gate 1114 from pivoting to an unlocked position. The relocker 1150 thereby serves as a tamper resistance mechanism, preventing the key 146 from being released when a mechanical shock is applied to the unit (by hammer, for example), or if a hole is drilled into the housing of the decoder unit 140 and a force is manually applied to the latch gate 1114. Illustratively, if a force in the direction of the arrow 1200 in FIG. 12 is manually applied to the latch gate 1114, the latch gate 1114 will pivot slightly in the direction of the arrow 1200 (while sliding along the rack 1132) until it engages with the finger 1152. The relocker 1150 will thereafter prevent the latch gate 1114 from pivoting further, and will thus prevent the lock 1115 from being opened.

When the proper stepping sequence is applied to the stepper motor 514 (under the control of the receive data software routine described above), the motor shaft 632 rotates in a clockwise direction. The torque generated by the stepper motor 514 is sufficient to overcome the biasing force provided by the spring 1120. The rotation of the motor shaft 632 thus causes the relocker 1150 to rotate in the direction of the arrow 1210 in FIG. 12 while causing the rack 1132 and latch gate 1114 to move in the direction of the arrow 1200 in FIG. 12. The relocker 1150 rotates rapidly enough so that the finger 1152 moves out of the way of the latch gate 1114, allowing the latch gate 1114 to pivot to the unlocked position shown in FIG. 13. As the rack 1132 pulls the latch gate 1114 to this unlocked state, the guide 1136 of the rack and pinion assembly 1126 rotates slightly in a clockwise direction to accommodate a change in the angular position of the rack 1132, as can be seen by a comparison of FIGS. 12 and 13.

The biasing force provided by the spring 1120 is sufficient to overcome the drag or detent force of the stepper motor 514 in the event that power to the decoder unit 140 is cut off at any time, or if the internal circuitry of the decoder unit 140 fails. Thus, provided that the key 146 is inserted and is in a locked rotational position, the latch gate 1114 and the relocker 1150 will return to their respective locked positions of FIGS. 11 and 12 in the event of an electrical or software failure.

Referring to FIG. 13, the latch gate 1114 is held in a position that permits the cam 1108 to be rotated in the direction of the arrow by manually rotating the key 146. The stop 1110 limits the angular rotation of the cam 1108. With the cam 1108 rotated to the position shown, the key 146 may be removed from the socket 144. As described above, the microprocessor 501 (FIG. 5) of the decoder unit 140 preferably holds the stepper motor 514 in this rotational position for a preprogrammed period of time or "release window," such as 10 seconds, allowing an authorized user to remove the key 146. At the end of the release window, the microprocessor 501 (FIG. 5) stops driving the stepper motor 514, and the spring 1120 urges the latch gate 1114 toward the locked position. If the cam 1108 is in the locked position at the end of the release window (indicating that the key 146 is inserted and rotated to the locked position), the spring 1120 returns the latch gate 1114, rack 1132, stepper motor 514 and relocker 1150 to the their respective locked positions of FIGS. 11 and 12, preventing removal of the key 146.

Still referring to FIG. 13, rotation of the key 146 to the unlocked position (during the release window) rotates the cam 1108 to a position such that the cam 1108 will obstruct the latch gate 1114 from returning to its locked position at the end of the release window. The cam 1108 remains in this position when the key 146 is removed. With the latch gate 1114 held in this unlocked position by the cam 1108, the microswitches 510 are maintained in an "off" state. The software of the decoder unit 140 can thus determine whether the key 146 has been returned and rotated to the locked position by reading one of the microswitches 510 after the release window expires. Since the pinned lock core of the cam-lock 1106 cannot be rotated by a key that does not match the cam-lock 1106, the cam 1108 cannot be rotated to the locked position using a non-matching key. Thus, only the matching key 146 (or an equivalently coded key) can be used to return the lock 1115 to a secure state.

When the authorized user is finished with the key 146, the key 146 is reinserted into the socket 144 and rotated to the locked position to re-secure the key within the socket 144. Rotation of the key 146 to the locked position rotates the cam 1108 to the locked position of FIG. 12, allowing the spring 1120 (FIG. 11) to return the latch gate 1114, rack 1132, motor 514 and relocker 1150 to their respective locked positions of FIGS. 11 and 12.

10. Alternative Embodiments

It will be recognized by those skilled in the art that various modifications to the system and methods described above can be made without departing from the spirit of the invention. By way of example, with minor modification to the locking mechanism shown in FIGS. 11–13, the key-activated cam-lock 1106 can be replaced with lock that is suitable for locking a cabinet or box, allowing the system and methods of the present invention to be used for controlling the release of other types of devices in addition to mechanical keys. Accordingly, the breadth and scope of the present invention should not be limited by any of the above-described exemplary embodiments, but should be defined only in accordance with the following claims and their equivalents.

In the claims which follow, alphabetic (and other) characters used to designate claim steps are provided for convenience of description only, and are not intended to imply any particular order for performing the steps.

What is claimed is:

1. A system for releasing a key at a remote location, comprising:

a decoder unit, said decoder unit comprising a key holder that holds the key, said key holder connected to a lock that prevents the key from being removed from said key holder, said lock coupled to a stepper motor that unlocks said lock to release the key, said stepper motor coupled to said lock such that said stepper motor must be sequenced through multiple angular steps of said stepper motor in order to unlock said lock;

a microprocessor coupled to said stepper motor such that said microprocessor directly controls said stepper motor; and an encoder unit that sends a key release command to said decoder unit to release the key.

2. The system as defined in claim 1, further comprising:

an RF transmitter connected to said encoder unit for transmitting said key release command; and an RF receiver connected to said decoder unit for receiving said key release command.

3. The system as defined in claim 1, wherein said encoder unit and said decoder unit connect to a telephone switching network.

4. The system as defined in claim 1, wherein said encoder unit and said decoder unit connect by cable.

5. The system as defined in claim 1, further comprising a touch device for application to a touch receptacle of said decoder unit, said touch device storing an identification number that is transmitted to said decoder unit by application of said touch device to said touch receptacle.

6. The system as defined in claim 1, wherein said encoder unit comprises a real time clock for selecting an encryption method for encrypting said key release command, and wherein said decoder unit comprises a real time clock for selecting a decryption method for decrypting said key release command, said real time clock of said decoder unit being substantially synchronized with said real time clock of said encoder unit to permit said decoder unit to select a decryption method that corresponds to an encryption method used by said encoder unit.

7. The system as defined in claim 6, further comprising a means for maintaining said real time clock of said encoder unit and said real time clock of said decoder unit in substantial synchronization.

8. The system as defined in claim 1, wherein said encoder unit comprises a front panel circuit that comprises a keypad and a display, said front panel circuit having a means for connecting to at least one additional front panel circuit to permit multiple users to simultaneously use said encoder unit.

9. The system as defined in claim 1, wherein said stepper motor is coupled to said lock such that said stepper motor must be sequenced through at least four angular steps in order to unlock said lock.

10. The system as defined in claim 1, wherein said stepper motor comprises a plurality of drive inputs for controlling the rotation of a rotor of said stepper motor, and wherein each of said drive inputs of said plurality is driven by a respective output line of said microprocessor.

11. The system as defined in claim 1, further comprising a spring that biases said lock toward a locked position.

12. A decoder unit for securing a key and for releasing the key to an authorized user, comprising:

a lock;

a key holder that secures the key when said lock is in a locked position;

a stepper motor mechanically coupled to said lock such that said stepper motor must be sequenced through multiple rotational steps in order to open said lock; and a microprocessor connected to said stepper motor for controlling said stepper motor to control the state of said lock, said microprocessor connected such that said stepper motor is directly controlled by said microprocessor without the use of a dedicated stepper motor control circuit.

13. The decoder unit as defined in claim 12, further comprising a spring that returns said lock to a locked position if power to said microprocessor is cut off while said lock is in an unlocked position.

14. The decoder unit as defined in claim 12, wherein said key holder comprises a key socket that holds the key by a coded portion of the key.

15. The decoder unit as defined in claim 12, wherein said microprocessor comprises an embedded one-time-programmable read-only-memory (ROM) that stores a software routine for decrypting a key release code.

16. The decoder unit as defined in claim 12, further comprising a touch receptacle for receiving a touch device, said touch device containing an identification number stored therein, said identification number being readable by said microprocessor when said touch device is applied to said touch receptacle.

17. The decoder unit as defined in claim 16, further comprising means for comparing said identification number with a list of valid identification numbers stored within said decoder unit to thereby determine whether a person is authorized to remove the key.

18. The decoder unit as defined in claim 12, further comprising a means for recording the current date and time when the key is removed from said key holder.

19. The decoder unit as defined in claim 12, further comprising a microswitch for sensing the state of said lock.

20. The decoder unit as defined in claim 12, further comprising a speech synthesizer, said speech synthesizer permitting said decoder unit to transmit a voice status message to a remote monitoring location.

21. The decoder unit as defined in claim 12, further comprising a rack and pinion assembly that connects said stepper motor to said lock.

22. The decoder unit as defined in claim 12, wherein said stepper motor must be sequenced through at least four rotational steps in order to unlock said lock.

23. The decoder unit as defined in claim 12, wherein said steppe motor comprises a plurality of coils, and wherein said microprocessor controls said stepper motor by selectively driving different coils of said plurality of coils.

24. A method of controlling a lock of a decoder unit, comprising the steps of:

(a) generating a release code, said release code comprising an error detection code;

(b) selecting an encryption method for encrypting said release code, said encryption method selected based on a value of an encoder clock such that different encryption methods are selected at different selection times;

(c) encrypting said release code using the encryption method selected in step (b) to produce an encrypted release code;

(d) transmitting said encrypted release code to said decoder unit, said decoder unit comprising a decoder clock which must be synchronized with said encoder clock to within a synchronization window in order to decrypt and interpret said encrypted release code; and at the decoder unit:

(e) receiving said encrypted release code transmitted in step (d), and attempting to decrypt the encrypted release code using a plurality of different decryption methods which correspond to a plurality of different values of the decoder clock, the step of attempting to decrypt comprising using said error detection code to determine whether each decryption attempt is successful; and (f) when a decryption attempt is successful, adjusting the decoder clock to correspond to the encoder clock.

25. The method as defined in claim 24, further comprising the pre-transmission steps of:

generating error correction codes for at least two groups of bits of said encrypted release code; and interlacing the bits of said encrypted release code and said error correction codes to enable post-transmission correction for burst errors by the decoder unit.

26. The method as defined in claim 24, wherein said step of selecting an encryption method comprises the steps of:

(b1) seeding a pseudo-random number generator with said value of said encoder clock to generate a pseudo-random number; and (b2) using said pseudo-random number to generate an encryption method.

27. The method as defined in claim 24, wherein step (e) comprises:

using a value held by the decoder clock of the decoder unit to select the plurality of different decryption methods, each of said plurality of decryption methods corresponding to and representing a respective guess of said value of said encoder clock used in step (b) to select said encryption method.

28. The method according to claim 24, further comprising the step of, at the decoder unit, determining a length of time since a most recent synchronization of the decoder clock, and adjusting the synchronization window based on said length of time.

29. The method according to claim 24, wherein step (f) further comprises opening the lock of the decoder unit when a decryption method is successful.

30. The method according to claim 24, wherein the encoder clock is a real-time clock which changes an output value on one-second increments.

31. The method according to claim 24, further comprising the step of:

(g) when step (e) is unsuccessful, using a touch memory device to manually synchronize the decoder clock with the encoder clock.

32. The method according to claim 24, wherein said release code further comprises a station code which identifies a target decoder unit of a plurality of decoder units, and step (f) is performed by regardless of whether the decoder unit is the target decoder unit.

33. The method according to claim 24, wherein the decoder unit is located with an emergency vehicle and operatively connected to a two-way voice radio of the vehicle, and step (e) comprises receiving the encrypted release code with the two-way voice radio.

34. A method of controlling a lock, comprising the steps of:

(a) providing a stepper motor that is mechanically coupled to at least a portion of said lock such that said stepper motor must be sequenced through a plurality of rotational steps in order to move said lock from a locked position to an unlocked position;

(b) providing a microprocessor that is electrically connected to control lines of said stepper motor such that said stepper motor is controlled by said microprocessor without the use of a separate stepper motor controller device; and (c) generating a sequence of values at the output of said microprocessor to rotate a shaft of said stepper motor and unlock said lock.

35. The method according to claim 34, wherein each value of said sequence of values corresponds to one step of said stepper motor.

36. The method according to claim 34, wherein said stepper motor is mechanically coupled to said lock such that at least four steps of said stepper motor are required to unlock said lock.

37. The method according to claim 34 further comprising the steps of:

reading an identification number from an identification device; and storing said identification number in a memory to record an identity of a user of said lock.

38. The method according to claim 34, wherein said step (c) comprises the steps of:

(c1) reading an identification number from an identification device;

(c2) comparing said identification number to a list of valid identification numbers; and (c3) generating said sequence of numbers to unlock said lock only if said identification number corresponds to a number in said list.

39. The method according to claim 34, further comprising the step of providing a spring that biases said shaft of said stepper to a starting position that corresponds to a locked position of said lock.

40. In microprocessor-controlled lock system, a method of reducing the likelihood that a lock will become unlocked when a microprocessor which controls said lock fails to operate properly, said method comprising the steps of:

mechanically coupling a stepper motor to said lock such that said stepper motor must be sequenced through at least four rotational steps in order to open said lock, said stepper motor comprising a plurality of coils for controlling a rotational position of said stepper motor;

providing a spring to bias said lock toward a locked position; and connecting a microprocessor to said stepper motor such that said microprocessor controls said lock by selectively driving different coils of said plurality of coils without the use of a dedicated stepper motor controller circuit.

41. The method as defined in claim 40, further comprising the step of programming said microprocessor to selectively drive said plurality of coils so as to sequence said stepper motor through said at least four rotational steps.

42. An electronically-controlled lock, comprising:

a mechanical lock, said lock having a locked position and an unlocked position;

a stepper motor mechanically coupled to said lock so as to move said lock between said locked and unlocked positions, said stepper motor coupled to said lock such that said stepper motor must be rotated by a plurality of rotational steps in order to move said lock from said locked position to said unlocked position;

a biasing member which biases said lock toward said locked position; and a microprocessor coupled to said stepper motor for controlling said lock.

43. The electronically-controlled lock as defined in claim 42, wherein said microprocessor is coupled to said stepper motor such that said stepper motor must be rotated by at least ⅔ of a revolution in order to move said lock from said locked position to said unlocked position.

44. The electronically-controlled lock as defined in claim 42, wherein said stepper motor comprises a plurality of rotation control inputs, and wherein each of said rotation control inputs is driven by a respective output line of said microprocessor.

45. The electronically-controlled lock as defined in claim 42, wherein said stepper motor is coupled to said lock such that said stepper motor must be rotated by at least four rotational steps in order to move said lock from said locked position to said unlocked position.

46. The electronically-controlled lock as defined in claim 42, wherein said stepper motor is coupled to said lock such that said stepper motor must be rotated by at least eight rotational steps in order to move said lock from said locked position to said unlocked position.

47. The electronically-controlled lock as defined in claim 42, wherein a biasing force produced by said biasing member is sufficient to overcome a drag created by said stepper motor so that said biasing member moves said lock to said locked position when no driving force is generated by said stepper motor.

48. A method of providing encryption in messages transmitted from an encoder unit to a decoder unit, said encoder unit comprising an encryptor clock for selecting an encryption technique, said method comprising the steps of:

(a) providing a plurality of decoder units, each decoder unit of said plurality having a respective decryptor clock, each decryptor clock being generally synchronized with said encoder clock during normal operation of the respective decoder unit;

(b) generating a message at the encoder unit, said message including an address which uniquely identifies one decoder unit of said plurality of decoder units;

(c) selecting an encryption method based on a current value of said encryptor clock;

(d) encrypting at least a portion of said message using said encryption method, to thereby generate an encrypted message;

(e) broadcasting said encrypted message from said encoder unit to said plurality of decoder units; and (f) at each respective decoder unit of said plurality of decoder units:

(i) receiving said encrypted message;

(ii) reading a decryptor clock value from the decryptor clock of the respective decoder unit and selecting a range of acceptable clock values therefrom;

(iii) attempting to decrypt said encrypted message using a plurality of different decryption methods, each of said plurality of different decryption methods corresponding to a respective clock value within said range of acceptable clock values;

(iv) upon successful decryption, of said encrypted message in step (iii), using the decryption method which produced said successful decryption to determine the encryptor clock value used in step (c) to select said encryption method; and (v) synchronizing the decryptor clock of the respective decoder unit using the encryptor clock value determined in step (iv).

49. The method as defined in claim 48, further comprising the steps of, at each decoder unit:

(vi) determining whether said message is addressed to the respective decoder unit; and (vii) processing a command contained within said message when said message is addressed to the respective decoder unit.

50. The method as defined in claim 49, wherein said command is a lock release command which causes a lock of the respective decoder to be placed in an unlocked position.

51. The method as defined in claim 48, wherein said step of selecting a range of acceptable clock values comprises determining a duration of time since the decryptor clock of the respective decoder unit was last synchronized.

52. The method as defined in claim 48, wherein said range of acceptable clock values is generated so as to correspond to an acceptable level of drift of the decryptor clock since a most recent synchronization of the decryptor clock.

53. A method of synchronizing a first device with a second device, said first device having a first clock and said second device having a second clock, said method comprising the steps of:

(a) reading a value from said second clock and using said value to select an encryption method;

(b) encrypting a message at said second device using said encryption method, to thereby generate an encrypted message;

(c) transmitting said encrypted message from said second device to said first device;

(d) attempting to decrypt said encrypted message at said first device using a plurality of alternative decryption methods, to thereby identify said encryption method used in step (b);

(e) based on the encryption method identified in step (d), determining said value of said second clock; and (f) setting said first clock to a value which corresponds to said value of said second clock determined in step (e).

54. The method as defined in claim 53, wherein said plurality of alternative decryption methods is selected by said first device based on a current value of said first clock.

55. The method as defined in claim 54, wherein said plurality of alternative decryption methods is further selected by said first device based on a duration of time since said first device was last synchronized.

56. The method according to claim 53, wherein the first device is located with an emergency vehicle and operatively connected to a two-way voice radio of the vehicle, and step (c) comprises transmitting the encrypted message to the first device via the two-way voice radio.

* * * * *